(12) United States Patent
Basu et al.

(10) Patent No.: US 9,273,195 B2
(45) Date of Patent: Mar. 1, 2016

(54) TIRES COMPRISING CELLULOSE ESTER/ELASTOMER COMPOSITIONS

(71) Applicant: Eastman Chemical Company, Kingsport, TN (US)

(72) Inventors: Soumendra Kumar Basu, Johnson City, TN (US); Bradley James Helmer, Kingsport, TN (US); Marcus David Shelby, Fall Branch, TN (US); Matthew Davie Wood, Gray, TN (US); Chris Stanley Dagenhart, Johnson City, TN (US); Jos Simon De Wit, Kingsport, TN (US); Carlo Antony Testa, Macclesfield (GB)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/690,953

(22) Filed: Nov. 30, 2012

(65) Prior Publication Data
US 2013/0131221 A1    May 23, 2013

Related U.S. Application Data

(63) Continuation-in-part of application No. 13/170,606, filed on Jun. 28, 2011, now Pat. No. 9,200,147.

(60) Provisional application No. 61/359,582, filed on Jun. 29, 2010, provisional application No. 61/567,948, filed on Dec. 7, 2011, provisional application No. 61/567,953, filed on Dec. 7, 2011, provisional application No. 61/567,951, filed on Dec. 7, 2011, provisional application No. 61/567,950, filed on Dec. 7, 2011.

(51) Int. Cl.
*C08L 1/10* (2006.01)
*C08L 1/08* (2006.01)
*C08L 1/14* (2006.01)
*B60C 1/00* (2006.01)

(52) U.S. Cl.
CPC ... *C08L 1/10* (2013.01); *B60C 1/00* (2013.01); *C08L 1/08* (2013.01); *C08L 1/14* (2013.01)

(58) Field of Classification Search
CPC .............. C08L 1/10; C08L 1/08; C08L 1/14; B60C 1/00
USPC .......................................................... 523/31
See application file for complete search history.

(56) References Cited

U.S. PATENT DOCUMENTS

| | | |
|---|---|---|
| 1,683,347 A | 9/1928 | Gray et al. |
| 1,698,049 A | 1/1929 | Clarke et al. |
| 1,880,560 A | 10/1932 | Webber et al. |
| 1,880,808 A | 10/1932 | Clarke et al. |
| 1,973,398 A | 9/1934 | Trolander et al. |
| 1,984,147 A | 12/1934 | Malm |
| 2,076,781 A | 4/1937 | Jacobsen |
| 2,129,052 A | 9/1938 | Fordyce |
| 2,138,392 A | 11/1938 | Weingand |
| 3,220,865 A | 11/1965 | Coney |
| 3,462,328 A | 8/1969 | Buckland |
| 3,522,070 A | 7/1970 | Webb, Jr. |
| 3,617,201 A | 11/1971 | Berni et al. |
| 3,668,157 A | 6/1972 | Combs et al. |
| 3,878,137 A | 4/1975 | Hess et al. |
| 3,922,239 A | 11/1975 | Koleske et al. |
| 3,959,193 A | 5/1976 | Putman et al. |
| 4,007,144 A | 2/1977 | Sanders et al. |
| 4,094,695 A | 6/1978 | Sanders |
| 4,098,734 A | 7/1978 | Lee |
| 4,104,210 A | 8/1978 | Coran et al. |
| 4,111,535 A | 9/1978 | Loshaek et al. |
| 4,141,863 A | 2/1979 | Coran et al. |
| 4,147,603 A | 4/1979 | Pacifici et al. |
| 4,156,677 A | 5/1979 | Williams et al. |
| 4,166,809 A | 9/1979 | Brewer et al. |
| 4,243,769 A | 1/1981 | Pritchett |
| 4,269,629 A | 5/1981 | Zannucci |
| 4,358,553 A | 11/1982 | Coran et al. |
| 4,443,595 A | 4/1984 | Namikoshi et al. |
| 4,499,043 A | 2/1985 | Yabe et al. |
| 4,506,045 A | 3/1985 | Waniczek et al. |
| 4,517,324 A | 5/1985 | Luhmann et al. |
| 4,604,425 A | 8/1986 | Ohmura et al. |
| 4,758,645 A | 7/1988 | Miyazono et al. |
| 4,801,632 A | 1/1989 | Eichenauer et al. |

(Continued)

FOREIGN PATENT DOCUMENTS

| | | |
|---|---|---|
| CN | 101186716 | 5/2008 |
| EP | 0236861 A2 | 2/1987 |

(Continued)

OTHER PUBLICATIONS

Gedon, Steven, et al.; "Cellulose Esters, Inorganic Esters," Kirk-Othmer Encyclopedia of Chemical Technology, 5th Edition, 2004, vol. 5, pp. 394-444.

Ghiya, et al., "Biodegradability of Cellulose Acetate Plasticized with Citrate Esters," Journal of Macromolecular Science, Part A, vol. 33, Issue 5, May 1996, pp. 627-638.

Angellier, H. et al., "Processing and Structural Properties of Waxy Maize Starch Nanocrystals Reinforced Natural Rubber," Macromolecules, 2005, pp. 3783-3792, vol. 38, American Chemical Society.

Angellier, H. et al., "Mechanical Properties of Waxy Maize Starch Nanocrystal Reinforced Natural Rubber," Macromolecules, 2005, pp. 9161-9170, vol. 38, American Chemical Society.

(Continued)

*Primary Examiner* — Alexander Kollias
(74) *Attorney, Agent, or Firm* — Polly C. Owen

(57) ABSTRACT

A tire is provided comprising a cellulose ester/elastomer composition wherein the cellulose ester/elastomer comprises at least one cellulose ester, at least one elastomer, and at least one additive selected from the group consisting of at least one compatibilizer and at least one plasticizer.

17 Claims, No Drawings

(56) References Cited

U.S. PATENT DOCUMENTS

| | | | |
|---|---|---|---|
| 4,839,230 A | 6/1989 | Cook | |
| 4,861,629 A | 8/1989 | Nahm | |
| 4,895,884 A | 1/1990 | Benko et al. | |
| 4,926,920 A | 5/1990 | Gouttebessis et al. | |
| 4,959,404 A | 9/1990 | Nakane et al. | |
| 4,970,247 A | 11/1990 | Hoppe et al. | |
| 4,983,730 A | 1/1991 | Domeshek et al. | |
| 5,011,874 A | 4/1991 | Hoppe et al. | |
| 5,047,180 A | 9/1991 | Steiner et al. | |
| 5,073,581 A | 12/1991 | Covelli et al. | |
| 5,077,338 A | 12/1991 | Tung et al. | |
| 5,082,914 A | 1/1992 | Cook et al. | |
| 5,104,450 A | 4/1992 | Sand et al. | |
| 5,166,233 A | 11/1992 | Kuroya et al. | |
| 5,182,379 A | 1/1993 | Cook et al. | |
| 5,219,510 A | 6/1993 | Machell et al. | |
| 5,256,453 A | 10/1993 | Heithorn et al. | |
| 5,279,659 A | 1/1994 | Nishiura et al. | |
| 5,281,647 A * | 1/1994 | Eapen | 524/314 |
| 5,286,768 A | 2/1994 | Walker | |
| 5,288,318 A | 2/1994 | Mayer et al. | |
| 5,290,830 A | 3/1994 | Tung et al. | |
| 5,292,783 A | 3/1994 | Buchanan et al. | |
| 5,292,877 A | 3/1994 | Edgar et al. | |
| 5,302,637 A | 4/1994 | Landry et al. | |
| 5,374,671 A | 12/1994 | Corvasce et al. | |
| 5,376,708 A | 12/1994 | Best et al. | |
| 5,384,163 A | 1/1995 | Budde et al. | |
| 5,393,333 A | 2/1995 | Trouve | |
| 5,393,476 A | 2/1995 | Suzuki | |
| 5,405,666 A | 4/1995 | Brindle | |
| 5,441,998 A | 8/1995 | Teeters et al. | |
| 5,446,079 A | 8/1995 | Buchanan et al. | |
| 5,478,386 A | 12/1995 | Itoh et al. | |
| 5,480,922 A | 1/1996 | Mulhaupt et al. | |
| 5,536,778 A | 7/1996 | Kreckel et al. | |
| 5,545,680 A | 8/1996 | Corvasce et al. | |
| 5,559,171 A | 9/1996 | Buchanan et al. | |
| 5,576,104 A | 11/1996 | Causa et al. | |
| 5,580,911 A | 12/1996 | Buchanan et al. | |
| 5,585,181 A | 12/1996 | Meraldi et al. | |
| 5,587,238 A | 12/1996 | Meraldi et al. | |
| 5,593,487 A | 1/1997 | Meraldi et al. | |
| 5,594,068 A | 1/1997 | Buchanan et al. | |
| 5,599,858 A | 2/1997 | Buchanan et al. | |
| 5,609,677 A | 3/1997 | Itoh et al. | |
| 5,624,975 A | 4/1997 | Valencia | |
| 5,631,078 A | 5/1997 | Ellery et al. | |
| 5,656,682 A | 8/1997 | Rimsa et al. | |
| 5,663,310 A | 9/1997 | Shimoda et al. | |
| 5,672,639 A | 9/1997 | Corvasce et al. | |
| 5,698,612 A | 12/1997 | Simon et al. | |
| 5,705,632 A | 1/1998 | Shimoda et al. | |
| 5,707,737 A | 1/1998 | Mori et al. | |
| 5,717,022 A | 2/1998 | Beckmann et al. | |
| 5,720,803 A | 2/1998 | Itoh et al. | |
| 5,720,804 A | 2/1998 | Martin | |
| 5,723,151 A | 3/1998 | Cook et al. | |
| 5,741,901 A | 4/1998 | Cook et al. | |
| 5,750,677 A | 5/1998 | Edgar et al. | |
| 5,753,140 A | 5/1998 | Shigemura | |
| 5,766,752 A | 6/1998 | Cox et al. | |
| 5,804,296 A | 9/1998 | Itoh et al. | |
| 5,806,834 A | 9/1998 | Yoshida | |
| 5,844,023 A | 12/1998 | Tomka | |
| 5,856,468 A | 1/1999 | Shuto et al. | |
| 5,871,573 A | 2/1999 | Cook et al. | |
| 5,880,278 A | 3/1999 | Huston et al. | |
| 5,910,544 A | 6/1999 | Ozawa et al. | |
| 5,928,777 A | 7/1999 | Cox et al. | |
| 5,938,869 A | 8/1999 | Kaido et al. | |
| 5,973,139 A | 10/1999 | Lee et al. | |
| 5,977,347 A | 11/1999 | Shuto et al. | |
| 5,981,738 A | 11/1999 | Cook et al. | |
| 6,001,484 A | 12/1999 | Horrion et al. | |
| 6,010,595 A | 1/2000 | Mitchell et al. | |
| 6,022,614 A | 2/2000 | Aubry et al. | |
| 6,036,885 A | 3/2000 | Krutak et al. | |
| 6,036,913 A | 3/2000 | Shibue et al. | |
| 6,046,259 A | 4/2000 | Das et al. | |
| 6,062,283 A | 5/2000 | Watanabe et al. | |
| 6,063,842 A | 5/2000 | Kwon et al. | |
| 6,079,465 A | 6/2000 | Takeyama et al. | |
| 6,103,253 A | 8/2000 | Hoffmann et al. | |
| 6,107,372 A | 8/2000 | Sakamaki | |
| 6,133,439 A | 10/2000 | Buchanan et al. | |
| 6,136,123 A | 10/2000 | Kaido et al. | |
| 6,139,785 A | 10/2000 | Shuto et al. | |
| 6,191,196 B1 | 2/2001 | Willett et al. | |
| 6,202,726 B1 | 3/2001 | Corvasce et al. | |
| 6,211,358 B1 | 4/2001 | Honda et al. | |
| 6,214,907 B1 | 4/2001 | Tomka | |
| 6,218,448 B1 | 4/2001 | Kraaijevanger et al. | |
| 6,225,381 B1 | 5/2001 | Sharma et al. | |
| 6,228,895 B1 | 5/2001 | Buchanan et al. | |
| 6,232,285 B1 | 5/2001 | Casteel et al. | |
| 6,258,799 B1 | 7/2001 | Kokubo et al. | |
| 6,261,689 B1 | 7/2001 | Meraldi et al. | |
| 6,269,858 B1 | 8/2001 | Sandstrom | |
| 6,273,163 B1 | 8/2001 | Materne et al. | |
| 6,274,653 B1 | 8/2001 | Hecht et al. | |
| 6,313,202 B1 | 11/2001 | Buchanan et al. | |
| 6,320,042 B1 | 11/2001 | Michihata et al. | |
| 6,334,919 B1 | 1/2002 | Takeyama et al. | |
| 6,345,656 B1 | 2/2002 | Corvasce et al. | |
| 6,359,071 B1 | 3/2002 | Watanabe et al. | |
| 6,362,256 B2 | 3/2002 | Willett et al. | |
| 6,369,214 B1 | 4/2002 | Tye et al. | |
| 6,382,285 B1 | 5/2002 | Mori et al. | |
| 6,390,164 B1 | 5/2002 | Beers | |
| 6,391,945 B2 | 5/2002 | Sandstrom | |
| 6,397,912 B1 | 6/2002 | Watanabe et al. | |
| 6,402,867 B1 | 6/2002 | Kaido et al. | |
| 6,403,696 B1 | 6/2002 | Barber et al. | |
| 6,427,736 B1 | 8/2002 | Meraldi et al. | |
| 6,437,023 B1 | 8/2002 | Otaki et al. | |
| 6,458,871 B2 | 10/2002 | Materne et al. | |
| 6,468,609 B2 | 10/2002 | Marien et al. | |
| 6,469,101 B2 | 10/2002 | Nahmias et al. | |
| 6,484,773 B1 | 11/2002 | Bruant | |
| 6,503,581 B1 | 1/2003 | Shibue et al. | |
| 6,506,824 B1 * | 1/2003 | Bastioli et al. | 524/47 |
| 6,539,996 B1 | 4/2003 | Corvasce et al. | |
| 6,548,578 B2 | 4/2003 | Pawlikowski | |
| 6,550,508 B1 | 4/2003 | Yamaguchi et al. | |
| 6,555,678 B1 | 4/2003 | Allandrieu et al. | |
| 6,562,938 B2 | 5/2003 | Haile et al. | |
| 6,569,827 B2 | 5/2003 | Van Dijk et al. | |
| 6,571,802 B1 | 6/2003 | Yamashita | |
| 6,588,470 B2 | 7/2003 | Kanenari et al. | |
| 6,600,034 B2 | 7/2003 | Sato et al. | |
| 6,617,383 B2 * | 9/2003 | Ikawa et al. | 524/167 |
| 6,620,866 B1 | 9/2003 | Obrecht et al. | |
| 6,646,066 B2 | 11/2003 | Hahn et al. | |
| 6,656,983 B1 | 12/2003 | Mayer et al. | |
| 6,683,174 B1 | 1/2004 | Ozaki et al. | |
| 6,712,896 B2 | 3/2004 | Ono et al. | |
| 6,730,374 B2 | 5/2004 | Gamble et al. | |
| 6,731,357 B1 | 5/2004 | Tachibana et al. | |
| 6,746,732 B2 | 6/2004 | Gamble et al. | |
| 6,773,497 B2 | 8/2004 | Katai | |
| 6,800,684 B2 | 10/2004 | Hayashi et al. | |
| 6,814,914 B2 | 11/2004 | Tasaka et al. | |
| 6,838,511 B2 | 1/2005 | Zanzig | |
| 6,844,033 B2 | 1/2005 | Shimizu et al. | |
| 6,848,487 B2 | 2/2005 | Weydert et al. | |
| 6,872,674 B2 | 3/2005 | Williams et al. | |
| 6,872,766 B2 | 3/2005 | Schunk et al. | |
| 6,878,760 B2 | 4/2005 | Corvasce et al. | |
| 6,881,457 B2 | 4/2005 | Tasaka et al. | |
| 6,881,770 B2 | 4/2005 | Mizuno et al. | |
| 6,897,303 B2 | 5/2005 | Yamada | |
| 6,914,139 B2 | 7/2005 | Mukunoki et al. | |
| 6,924,010 B2 | 8/2005 | Fredercik et al. | |

(56) References Cited

U.S. PATENT DOCUMENTS

| | | | |
|---|---|---|---|
| 6,946,519 B2 | 9/2005 | Okubo et al. |
| 6,958,394 B2 | 10/2005 | Saito |
| 6,966,999 B2 | 11/2005 | Tsou et al. |
| 6,974,608 B2 | 12/2005 | Shimizu et al. |
| 6,977,275 B2 | 12/2005 | Buchanan et al. |
| 6,984,631 B2 | 1/2006 | Aranishi et al. |
| 6,984,730 B2 | 1/2006 | Yamada et al. |
| 7,019,130 B2 | 3/2006 | Ito |
| 7,026,470 B2 | 4/2006 | Obie |
| 7,038,744 B2 | 5/2006 | Kuzuhara et al. |
| 7,041,745 B2 | 5/2006 | Lin et al. |
| 7,060,333 B2 | 6/2006 | Takeuchi et al. |
| 7,078,078 B2 | 7/2006 | Ito |
| 7,083,752 B2 | 8/2006 | Bermel |
| 7,102,499 B2 | 9/2006 | Myatt |
| 7,105,212 B2 | 9/2006 | Ito |
| 7,105,213 B2 | 9/2006 | Tasaka et al. |
| 7,117,911 B2 | 10/2006 | Kanenari et al. |
| 7,122,586 B2 | 10/2006 | Sandstrom et al. |
| 7,125,591 B2 | 10/2006 | Nakajima et al. |
| 7,125,918 B2 | 10/2006 | Shimizu et al. |
| 7,148,344 B2 | 12/2006 | Nakanishi et al. |
| 7,153,552 B2 | 12/2006 | Kubo et al. |
| 7,156,137 B2 | 1/2007 | Corvasce et al. |
| 7,163,975 B2 | 1/2007 | Zanzig et al. |
| 7,166,339 B1 | 1/2007 | Mori et al. |
| 7,166,665 B2 | 1/2007 | Galimberti et al. |
| 7,182,981 B1 | 2/2007 | Tachibana et al. |
| 7,184,112 B2 | 2/2007 | Kuzuhara et al. |
| 7,208,205 B2 | 4/2007 | Shibue et al. |
| 7,208,592 B2 | 4/2007 | Kawanishi et al. |
| 7,220,460 B2 | 5/2007 | Murakami et al. |
| 7,226,499 B2 | 6/2007 | Matsufuji et al. |
| 7,247,663 B2 | 7/2007 | Kikuchi et al. |
| 7,249,621 B2 | 7/2007 | Sandstrom |
| 7,250,201 B2 | 7/2007 | Yamazaki et al. |
| 7,252,864 B2 | 8/2007 | Nair et al. |
| 7,252,865 B2 | 8/2007 | Schunk et al. |
| 7,253,221 B2 | 8/2007 | Mohanty et al. |
| 7,273,894 B2 | 9/2007 | Shelby et al. |
| 7,276,546 B2 | 10/2007 | Buchanan et al. |
| 7,282,091 B2 | 10/2007 | Hashimoto |
| 7,306,832 B2 | 12/2007 | Tasaka et al. |
| 7,314,894 B2 | 1/2008 | Horiguchi et al. |
| 7,323,530 B2 | 1/2008 | Okubo et al. |
| 7,347,947 B2 | 3/2008 | Nakamura et al. |
| 7,354,633 B2 | 4/2008 | Saito et al. |
| 7,378,468 B2 | 5/2008 | Lechtenboehmer |
| 7,393,579 B2 | 7/2008 | Bermel |
| 7,404,424 B2 | 7/2008 | Higuchi et al. |
| 7,445,821 B2 | 11/2008 | Michihata |
| 7,459,212 B2 | 12/2008 | Yamakwa et al. |
| 7,462,306 B2 | 12/2008 | Fukagawa |
| 7,462,382 B2 | 12/2008 | Ito et al. |
| 7,466,377 B2 | 12/2008 | Umeda et al. |
| 7,468,153 B2 | 12/2008 | Weydert et al. |
| 7,470,385 B2 | 12/2008 | Yamada |
| 7,471,360 B2 | 12/2008 | Murakami et al. |
| 7,479,312 B2 | 1/2009 | Tamagawa et al. |
| 7,501,167 B2 | 3/2009 | Sugiyama |
| 7,504,139 B2 | 3/2009 | Kawanishi et al. |
| 7,528,181 B2 | 5/2009 | Bailey et al. |
| 7,550,182 B2 | 6/2009 | Inagaki et al. |
| 7,559,986 B2 | 7/2009 | Takeuchi et al. |
| 7,569,259 B2 | 8/2009 | Okubo et al. |
| 7,569,261 B2 | 8/2009 | Sasada |
| 7,585,905 B2 | 9/2009 | Shelton et al. |
| 7,599,028 B2 | 10/2009 | Kuzuhara et al. |
| 7,604,852 B2 | 10/2009 | Oya |
| 7,611,760 B2 | 11/2009 | Hayashi et al. |
| 7,615,264 B2 | 11/2009 | Fukagawa et al. |
| 7,625,970 B2 | 12/2009 | Klinkenberg et al. |
| 7,635,506 B2 | 12/2009 | Takagi |
| 7,651,743 B2 | 1/2010 | Fukagawa et al. |
| 7,659,331 B2 | 2/2010 | Gibson et al. |
| 7,662,801 B2 | 2/2010 | Kumar et al. |
| 7,666,482 B2 | 2/2010 | Umeda et al. |
| 7,695,780 B2 | 4/2010 | Ohgaru et al. |
| 7,704,570 B2 | 4/2010 | Takebe et al. |
| 7,709,067 B2 | 5/2010 | Takagi et al. |
| 7,709,572 B2 | 5/2010 | Takebe et al. |
| 7,732,523 B2 | 6/2010 | Morimoto et al. |
| 7,799,873 B2 | 9/2010 | Soeda |
| 7,868,073 B2 | 1/2011 | Kameda |
| 7,897,662 B2 | 3/2011 | Jozef Klinkenberg et al. |
| 7,947,141 B2 | 5/2011 | Kameda et al. |
| 8,003,725 B2 | 8/2011 | Chapman et al. |
| 8,021,730 B2 | 9/2011 | Tsou et al. |
| 8,022,136 B2 | 9/2011 | Yano et al. |
| 8,067,488 B2 | 11/2011 | Buchannan et al. |
| 8,092,627 B2 | 1/2012 | Hashimura et al. |
| 8,188,164 B2 | 5/2012 | Chen et al. |
| 8,201,603 B2 | 6/2012 | Matsuda et al. |
| 8,372,193 B2 | 2/2013 | Chen et al. |
| 8,552,105 B2 | 10/2013 | Peters |
| 2002/0028857 A1 | 3/2002 | Holy |
| 2002/0086163 A1 | 7/2002 | Shimizu et al. |
| 2002/0132960 A1 | 9/2002 | Haile et al. |
| 2002/0156270 A1 | 10/2002 | Kazama et al. |
| 2002/0192397 A1 | 12/2002 | Tsujimoto |
| 2003/0092801 A1* | 5/2003 | Agostini et al. ............ 524/27 |
| 2003/0171458 A1* | 9/2003 | Buchanan et al. ......... 524/32 |
| 2004/0024093 A1 | 2/2004 | Weydert et al. |
| 2004/0116587 A1 | 6/2004 | Thielen et al. |
| 2004/0174474 A1 | 9/2004 | Tachibana et al. |
| 2004/0180993 A1 | 9/2004 | Shelton et al. |
| 2004/0181009 A1 | 9/2004 | Shelton et al. |
| 2004/0182486 A1 | 9/2004 | Bernard et al. |
| 2005/0056356 A1 | 3/2005 | Lechtenbohmer et al. |
| 2005/0192434 A1 | 9/2005 | Buchanan et al. |
| 2005/0234231 A1 | 10/2005 | Hashimoto et al. |
| 2006/0004192 A1 | 1/2006 | Oya et al. |
| 2006/0058425 A1 | 3/2006 | Mohanty et al. |
| 2006/0068128 A1 | 3/2006 | Greener et al. |
| 2006/0069192 A1 | 3/2006 | Nakamura et al. |
| 2006/0106149 A1 | 5/2006 | Sandstrom et al. |
| 2006/0106164 A1 | 5/2006 | Suzuki |
| 2006/0142559 A1 | 6/2006 | Ozaki et al. |
| 2006/0188667 A1 | 8/2006 | Watanabe et al. |
| 2006/0222786 A1 | 10/2006 | Oya et al. |
| 2006/0286397 A1 | 12/2006 | McCreight et al. |
| 2007/0046872 A1 | 3/2007 | Tasaka |
| 2007/0048461 A1 | 3/2007 | Nakajima et al. |
| 2007/0048462 A1 | 3/2007 | Takebe et al. |
| 2007/0092663 A1 | 4/2007 | Murakami |
| 2007/0178252 A1 | 8/2007 | Tasaka et al. |
| 2007/0209744 A1 | 9/2007 | Matsumura |
| 2007/0211336 A1 | 9/2007 | Michihata |
| 2007/0241480 A1 | 10/2007 | Kanenari et al. |
| 2007/0247576 A1 | 10/2007 | Tamagawa et al. |
| 2007/0264446 A1 | 11/2007 | Otoshi et al. |
| 2007/0298194 A1 | 12/2007 | Fukagawa et al. |
| 2008/0032067 A1 | 2/2008 | Sakurazawa et al. |
| 2008/0085953 A1* | 4/2008 | Bhattacharya et al. ......... 524/37 |
| 2008/0093012 A1 | 4/2008 | Hashimura |
| 2008/0105213 A1 | 5/2008 | Chen |
| 2008/0122128 A1 | 5/2008 | Irie et al. |
| 2008/0139803 A1 | 6/2008 | Sasada |
| 2008/0173215 A1 | 7/2008 | Sakurazawa et al. |
| 2008/0182924 A1 | 7/2008 | Morimoto et al. |
| 2008/0213512 A1 | 9/2008 | Nakamura et al. |
| 2008/0214699 A1 | 9/2008 | Halahmi et al. |
| 2008/0261722 A1 | 10/2008 | Bulpett et al. |
| 2008/0280072 A1 | 11/2008 | Arai et al. |
| 2008/0314491 A1 | 12/2008 | Soeda et al. |
| 2008/0314492 A1 | 12/2008 | Tsou et al. |
| 2009/0038728 A1 | 2/2009 | Kanenari |
| 2009/0043088 A1 | 2/2009 | Shimamoto et al. |
| 2009/0050842 A1 | 2/2009 | Shelby et al. |
| 2009/0053496 A1 | 2/2009 | Arita et al. |
| 2009/0054638 A1 | 2/2009 | Shelby et al. |
| 2009/0057610 A1 | 3/2009 | Godfrey |
| 2009/0062413 A1 | 3/2009 | Adur et al. |
| 2009/0062431 A1 | 3/2009 | Nasr et al. |

(56) References Cited

U.S. PATENT DOCUMENTS

| | | |
|---|---|---|
| 2009/0068377 A1 | 3/2009 | Kuki |
| 2009/0074989 A1 | 3/2009 | Nakamura et al. |
| 2009/0082492 A1 | 3/2009 | Klinkenberg et al. |
| 2009/0082511 A1 | 3/2009 | Klinkenberg et al. |
| 2009/0084550 A1 | 4/2009 | Korte et al. |
| 2009/0092771 A1 | 4/2009 | Sasata et al. |
| 2009/0096962 A1 | 4/2009 | Shelton et al. |
| 2009/0114329 A1 | 5/2009 | Tomoi |
| 2009/0142515 A1 | 6/2009 | Nakamura et al. |
| 2009/0143502 A1 | 6/2009 | Obie |
| 2009/0151841 A1 | 6/2009 | Jones et al. |
| 2009/0169772 A1 | 7/2009 | Yamada et al. |
| 2009/0169775 A1 | 7/2009 | Mukunoki et al. |
| 2009/0174845 A1 | 7/2009 | Takagi |
| 2009/0181232 A1 | 7/2009 | Wang et al. |
| 2009/0185112 A1 | 7/2009 | Kawabe et al. |
| 2009/0203898 A1 | 8/2009 | Buchanan et al. |
| 2009/0203899 A1 | 8/2009 | Buchanan et al. |
| 2009/0203900 A1 | 8/2009 | Buchanan et al. |
| 2009/0207491 A1 | 8/2009 | Takebe et al. |
| 2009/0211683 A1 | 8/2009 | Takahashi |
| 2009/0218024 A1 | 9/2009 | Tsou et al. |
| 2009/0227782 A1 | 9/2009 | Fujita et al. |
| 2009/0230576 A1 | 9/2009 | Nagashima |
| 2009/0246416 A1 | 10/2009 | Kawabe et al. |
| 2009/0246674 A1 | 10/2009 | Carlini et al. |
| 2009/0247682 A1 | 10/2009 | Galimberti et al. |
| 2009/0251643 A1 | 10/2009 | Yamada et al. |
| 2009/0253871 A1 | 10/2009 | Flynn et al. |
| 2009/0283194 A1 | 11/2009 | Hashimoto et al. |
| 2009/0286095 A1 | 11/2009 | Shelton et al. |
| 2009/0306361 A1 | 12/2009 | Kawabe et al. |
| 2009/0317567 A1 | 12/2009 | Takeda et al. |
| 2010/0002297 A1 | 1/2010 | Shibuya |
| 2010/0018622 A1 | 1/2010 | Tanno et al. |
| 2010/0024941 A1 | 2/2010 | Hara et al. |
| 2010/0040806 A1 | 2/2010 | Suzuki et al. |
| 2010/0040854 A1 | 2/2010 | Takada et al. |
| 2010/0040889 A1 | 2/2010 | Harano et al. |
| 2010/0043937 A1 | 2/2010 | Matsunaga et al. |
| 2010/0047480 A1 | 2/2010 | Suzuki et al. |
| 2010/0050889 A1 | 3/2010 | Manzini et al. |
| 2010/0069535 A1 | 3/2010 | Suzuki et al. |
| 2010/0071823 A1 | 3/2010 | Tomoi |
| 2010/0079707 A1 | 4/2010 | Nakayama et al. |
| 2010/0089288 A1 | 4/2010 | Shelby et al. |
| 2010/0105830 A1 | 4/2010 | Kaneko |
| 2010/0108212 A1 | 5/2010 | Kameda et al. |
| 2010/0108221 A1 | 5/2010 | Shibata et al. |
| 2010/0147440 A1 | 6/2010 | Matsunaga |
| 2010/0154960 A1 | 6/2010 | Kishizoe |
| 2010/0178309 A1 | 7/2010 | Matsui et al. |
| 2010/0181003 A1 | 7/2010 | Inoue |
| 2010/0184885 A1 | 7/2010 | Kawamura et al. |
| 2010/0236695 A1 | 9/2010 | Lamontia et al. |
| 2010/0288410 A1 | 11/2010 | Mori |
| 2010/0317800 A1 | 12/2010 | Pille-Wolf et al. |
| 2010/0319829 A1 | 12/2010 | Hashimura et al. |
| 2011/0030868 A1 | 2/2011 | Hamanaka |
| 2011/0039976 A1 | 2/2011 | Vasseur |
| 2011/0039986 A1 | 2/2011 | Takada et al. |
| 2011/0041975 A1 | 2/2011 | Iizuka |
| 2011/0046272 A1 | 2/2011 | Smits et al. |
| 2011/0056603 A1 | 3/2011 | Koutoku et al. |
| 2011/0136939 A1 | 6/2011 | Lechtenboehmer et al. |
| 2011/0160354 A1 | 6/2011 | Kouno et al. |
| 2011/0198011 A1 | 8/2011 | Matsuda et al. |
| 2011/0319529 A1 | 12/2011 | Helmer et al. |
| 2011/0319530 A1 | 12/2011 | Helmer et al. |

FOREIGN PATENT DOCUMENTS

| | | |
|---|---|---|
| EP | 0722980 A1 | 7/1996 |
| EP | 1086830 B1 | 11/2004 |
| EP | 1514900 B1 | 12/2007 |
| EP | 2039532 A1 | 3/2009 |
| EP | 2072574 A1 | 6/2009 |
| EP | 2333008 A1 | 6/2011 |
| JP | 63-189476 | 8/1933 |
| JP | 62-032137 | 2/1987 |
| JP | H082597413217239 A | 10/1996 |
| JP | 2005053944 A | 3/2005 |
| JP | 2006111858 A | 4/2006 |
| JP | 2007-161943 A | 6/2007 |
| JP | 2007224253 A | 9/2007 |
| JP | 2009096917 A | 5/2009 |
| JP | 2009263417 A | 11/2009 |
| RU | 2 050 390 | 12/1995 |
| WO | WO 00/34383 A1 | 6/2000 |
| WO | WO 2005/108480 A1 | 11/2005 |
| WO | WO 2005/111184 A2 | 11/2005 |
| WO | WO 2009/029217 A1 | 3/2009 |
| WO | WO 2009/063694 | 5/2009 |
| WO | WO 2010/032551 A1 | 3/2010 |

OTHER PUBLICATIONS

Angellier, H. et al., "Optimization of the Preparation of Aqueous Suspensions of Waxy Maize Starch Nanocrystals Using a Response Surface Methodology," Biomacromolecules, 2004, pp. 1545-1551, vol. 5, American Chemical Society.

Putaux, J. et al., "Platelet Nanocrystals Resulting from the Disruption of Waxy Maize Starch Granules by Acid Hydrolysis," Biomacromolecules, 2003, pp. 1198-1202, vol. 4, American Chemical Society.

Basu, S., "Cellulose Esters in Rubber II: Preparation of Sub-Micron Cellulose Ester Particles for Application as Fillers in Tire Treads," Eastman Chemical Company Technical Report 2009-07319, 2009.

Wu, Y. et al., "A Strategy to Prepare High Performance Starch/rubber Composites: In Situ Modification During Latex Compounding Process," Carbohydrate Polymers, 2006, pp. 109-113, vol. 65, Elsevier Ltd.

Bai, W. et al., "Partial Replacement of Silica with Microcrystalline Cellulose in Rubber Composites," Composites: Part A, 2009, pp. 1597-1605, vol. 40, Elsevier Ltd.

Critical Surface Tension Parameters for Various Polymers. Accudynetests website. Dated 2009. Downloaded Nov. 28, 2012.

Nie, L., et al., "Grafting Cellulose Acetate with Styrene Maleic Anydride Random Copolymers for Improved Dimensional Stability of Cellulose Acetate", J. Applied Polymer Sci., 2003, 54, 601-617.

"Eastman Cellulose-based specialty polymers", Bulletin E-325G 6/09. [Downloaded from internet on Jan. 16, 2013. Website: http://web.archive.org/web/20110516033534/http://www.eastman.com/Literature_Center/E/E325.pdf] May 16, 2001 p. 8, Table 1.

Bai, W. "New Application of Crystalline Cellulose in Rubber Composites", Nov. 3, 2009, A Dissertation submitted to Oregon State University, pp. 1-204, entire document. (Abstract).

Copending U.S. Appl. No. 13/170,595, filed Jun. 28, 2011, Bradley James Helmer et al.

Copending U.S. Appl. No. 13/170,606, filed Jun. 28, 2011, Bradley James Helmer et al.

Copending U.S. Appl. No. 13/170,609, filed Jun. 28, 2011, Bradley James Helmer et al.

Copending U.S. Appl. No. 13/170,611, filed Jun. 28, 2011, Bradley James Helmer et al.

USPTO Office Action mailed Dec. 6, 2012 for U.S. Appl. No. 13/170,609.

Copending U.S. Appl. No. 13/690,909, filed Nov. 30, 2012.
Copending U.S. Appl. No. 13/690,945, filed Nov. 30, 2012.
Copending U.S. Appl. No. 13/690,968, filed Nov. 30, 2012.
Copending U.S. Appl. No. 13/691,007, filed Nov. 30, 2012.
Copending U.S. Appl. No. 13/690,930, filed Nov. 30, 2012.
Copending U.S. Appl. No. 13/690,937, filed Nov. 30, 2012.
Copending U.S. Appl. No. 13/690,890, filed Nov. 30, 2012.
Copending U.S. Appl. No. 13/690,919, filed Nov. 30, 2012.
Copending U.S. Appl. No. 13/690,935, filed Nov. 30, 2012.
Copending U.S. Appl. No. 13/690,944, filed Nov. 30, 2012.
Copending U.S. Appl. No. 13/690,958, filed Nov. 30, 2012.
Copending U.S. Appl. No. 13/690,981, filed Nov. 30, 2012.

(56) References Cited

OTHER PUBLICATIONS

USPTO Office Action received in U.S. Appl. No. 13/170,609, on Jul. 2, 2013.
USPTO Office Action received in U.S. Appl. No. 13/170,606, on Aug. 21, 2013.
Notification of Transmittal of the International Search Report and the Written Opinion of the International Searching Authority, or the Declaration, International Application No. PCT/US 11/42266 with a filing date of Jun. 29, 2011.
Notification of Transmittal of the International Search Report and the Written Opinion of the International Searching Authority, or the Declaration, International Application No. PCT/US2012/068086 with a filing date of Feb. 28, 2013.
Notification of Transmittal of the International Search Report and the Written Opinion of the International Searching Authority, or the Declaration, International Application No. PCT/US 12/68131 with a mailing date of Feb. 5, 2013.
Notification of Transmittal of the International Search Report and the Written Opinion of the International Searching Authority, or the Declaration, International Application No. PCT/US 12/68096 with a mailing date of Feb. 15, 2013.
Notification of Transmittal of the International Search Report and the Written Opinion of the International Searching Authority, or the Declaration, International Application No. PCT/US 12/68124 with a mailing date of Feb. 19, 2013.
Notification of Transmittal of the International Search Report and the Written Opinion of the International Searching Authority, or the Declaration, International Application No. PCT/US 12/68114 with a mailing date of Feb. 25, 2013.
Notification of Transmittal of the International Search Report and the Written Opinion of the International Searching Authority, or the Declaration, International Application No. PCT/US 12/68140 with a mailing date of Feb. 15, 2013.
Notification of Transmittal of the International Search Report and the Written Opinion of the International Searching Authority, or the Declaration, International Application No. PCT/US 12/68109 with a mailing date of Feb. 15, 2013.
Notification of Transmittal of the International Search Report and the Written Opinion of the International Searching Authority, or the Declaration, International Application No. PCT/US 12/68147 with a mailing date of Feb. 19, 2013.
Notification of Transmittal of the International Search Report and the Written Opinion of the International Searching Authority, or the Declaration, International Application No. PCT/US2012/068088 with a mailing date of Feb. 22, 2013.
Notification of Transmittal of the International Search Report and the Written Opinion of the International Searching Authority, or the Declaration, International Application No. PCT/US 12/68097with a mailing date of Feb. 15, 2013.
Notification of Transmittal of the International Search Report and the Written Opinion of the International Searching Authority, or the Declaration, International Application No. PCT/US2012/068093 with a mailing date of Feb. 19, 2013.
Notification of Transmittal of the International Search Report and the Written Opinion of the International Searching Authority, or the Declaration, International Application No. PCT/US 12/68100 with a mailing date of Feb. 19, 2013.
Notification of Transmittal of the International Search Report and the Written Opinion of the International Searching Authority, or the Declaration, International Application No. PCT/US 12/68102 with a mailing date of Feb. 19, 2013.
European Search Report dated Dec. 11, 2013 with an application No. 11804164.9—1306/2588518 PCT/US2011042266.
USPTO Office Action dated Feb. 6, 2014 for copending U.S. Appl. No. 13/170,606.
USPTO Office Action dated Feb. 13, 2014 for copending U.S. Appl. No. 13/170,609.
Anneken, David J., et al.; "Fatty Acids"; Ullmann's Encyclopedia of Industrial Chemistry, vol. 14, pp. 73-116, Published online Dec. 15, 2006.
USPTO Office Action dated Apr. 23, 2014 for copending U.S. Appl. No. 13/690,919.
USPTO Office Action dated Apr. 29, 2014 for copending U.S. Appl. No. 13/690,944.
USPTO Office Action dated Apr. 29, 2014 for copending U.S. Appl. No. 13/690,981.
USPTO Office Action dated May 7, 2014 for copending U.S. Appl. No. 13/690,937.
Reinecke Helmut, et al.; "Plasticizers"; Encyclopedia of Polymer Science and Technology; Copyright 2011, pp. 1-27.
USPTO Office Action dated May 15, 2014 for copending U.S. Appl. No. 13/690,945.
USPTO Office Action dated May 15, 2014 for copending U.S. Appl. No. 13/690,958.
USPTO Office Action dated Jun. 2, 2014 for copending U.S. Appl. No. 13/690,890.
USPTO Office Action dated Jun. 2, 2014 for copending U.S. Appl. No. 13/690,909.
USPTO Office Action dated Jun. 6, 2014 for copending U.S. Appl. No. 13/170,611.
USPTO Office Action dated Jul. 1, 2014 for copending U.S. Appl. No. 13/170,595.
USPTO Office Action dated Jul. 2, 2014 for copending U.S. Appl. No. 13/690,968.
Eastman Cellulose Acetate Butyrate (CAB-381-0.1); Product Data Sheet; http://ws.eastman.com/ProductCatalogApps/PageControllers/ProdDatasheet_PC.aspx?Product=71001226; Obtained on Jun. 10, 2014.
USPTO Office Action dated Jul. 7, 2014 for copending U.S. Appl. No. 13/690,930.
USPTO Office Action dated Jul. 17, 2014 for copending U.S. Appl. No. 13/691,007.
USPTO Office Action dated Jul. 18, 2014 for copending U.S. Appl. No. 13/690,935.
USPTO Office Action dated Oct. 2, 2014 for copending U.S. Appl. No. 13/170,609.
USPTO Office Action dated Oct. 14, 2014 for copending U.S. Appl. No. 13/690,945.
USPTO Office Action dated Oct. 14, 2014 for copending U.S. Appl. No. 13/690,958.
USPTO Office Action dated Dec. 10, 2014 for copending U.S. Appl. No. 13/690,944.
USPTO Office Action dated Dec. 11, 2014 for copending U.S. Appl. No. 13/690,981.
USPTO Office Action dated Dec. 26, 2014 for copending U.S. Appl. No. 13/690,968.
USPTO Office Action dated Dec. 26, 2014 for copending U.S. Appl. No. 13/691,007.
USPTO Office Action dated Dec. 26, 2014 for copending U.S. Appl. No. 13/690,935.
USPTO Office Action dated Feb. 4, 2015 for co-pending U.S. Appl. No. 13/690,945.
USPTO Office Action dated Feb. 4, 2015 for co-pending U.S. Appl. No. 13/690,958.
USPTO Office Action dated Feb. 24, 2015 for co-pending U.S. Appl. No. 13/170,595.
USPTO Notice of Allowance dated Mar. 25, 2015 for co-pending U.S. Appl. No. 13/170,609.

* cited by examiner

TIRES COMPRISING CELLULOSE ESTER/ELASTOMER COMPOSITIONS

RELATED APPLICATIONS

This application is a continuation in part application to U.S. patent application Ser. No. 13/170,606 filed on Jun. 28, 2011 which claims priority to U.S. Provisional Application No. 61/359,582 filed Jun. 29, 2010; and claims priority to U.S. Provisional Application Nos. 61/567,948, 61/567,950, 61/567,951, and 61/567,953 filed on Dec. 7, 2011, the disclosures of which are incorporated herein by reference to the extent they do not contradict the statements herein.

FIELD OF THE INVENTION

This invention belongs to the field of cellulose ester chemistry, particularly to cellulose esters comprising compatibilizers and optionally, plasticizers. The invention also belongs to the field of cellulose ester/elastomer compositions comprising at least one elastomer and at least one additive wherein the additive is at least one selected from the group consisting of a compatibilizer and a plasticizer. Processes for producing the cellulose ester compositions and the cellulose ester/elastomer compositions are also provided.

BACKGROUND OF THE INVENTION

This invention relates to the dispersion of cellulose esters in elastomers as small particles to improve the mechanical and physical properties of the elastomer. Polar cellulose esters (CE) are incompatible with non-polar elastomers. In addition, high melting cellulose esters do not melt at typical melt processing temperature of elastomers. These factors make dispersion of cellulose esters into elastomers difficult via most industrially utilized melt mixing process. Due to the above problems, cellulose esters are not an obvious choice as an additive to non-polar elastomers.

This invention can overcome these difficulties by using plasticizers where necessary to help reduce the melt temperature of cellulose esters and by using compatibilizers to help improve mixing and compatibility of cellulose esters and elastomers. Although not wishing to be bound by theory, it is believed that the compatibilizers used can also improve mechanical and physical properties of the cellulose ester/ elastomer compositions by improving the interfacial interaction/bonding between the cellulose ester and the elastomer. These cellulose ester/elastomer compositions can be used in rubber/elastomeric applications ranging from tires, hoses, belts, gaskets, automotive parts, and the like.

A process of dispersing cellulose esters in elastomers involves melting or softening cellulose esters so that the cellulose esters can flow and subsequently break down into small particles (dispersion) under shear processing. After dispersion, the cellulose esters can re-solidify upon cooling to room temperature to reinforce the rubber. Therefore, the incorporation of cellulose ester into elastomeric compositions can lower Mooney viscosity which can help with the processing of the composition through equipment, such as, mixers, calenders, extruders, and molding equipment. It can also provide longer scorch safety which provides for a longer safety time during processing. Shorter cure times can also be obtained which allows for faster turnaround time in curing molds and presses. The addition of the cellulose ester to the elastomer can also provide for higher break stress/strain, higher low strain modulus, and higher tear strength providing a tougher and stiffer composition. Finally, the addition of the cellulose ester can provide a lower tan delta at 30 C which allows for lower heat buildup and lower hysteresis.

BRIEF SUMMARY OF THE INVENTION

In one embodiment of the invention, a cellulose ester composition is provided comprising at least one cellulose ester, at least one compatibilizer, and optionally, and at least one plasticizer.

In another embodiment of the invention, a cellulose ester/ elastomer composition is provided comprising at least one elastomer, at least one cellulose ester, and at least one additive; wherein the additive is at least one selected from the group consisting of a compatibilizer and a plasticizer.

In another embodiment of the invention, a process for producing the cellulose ester composition is provided comprising contacting at least one cellulose ester, at least one compatibilizer, and optionally, at least one plasticizer.

In another embodiment of the invention, a process for producing a cellulose ester/elastomer composition is provided comprising mixing at least one elastomer, at least one cellulose ester, and at least one additive for a sufficient time and temperature to disperse the cellulose ester to produce the cellulose ester/elastomer composition; wherein the additive is at least one selected from the group consisting of a compatibilizer and a plasticizer.

In another embodiment, an article is provided comprising the cellulose ester/elastomer composition.

In another embodiment of the invention, a tire component is provided comprising at least one elastomer, at least one filler, at least one cellulose ester, and at least one additive selected from the group consisting of at least one compatibilizer and at least one plasticizer.

Other inventions concerning the use of cellulose esters in elastomers have been filed in provisional applications by Eastman Chemical Company on Dec. 7, 2011 entitled "Cellulose Esters in Pneumatic Tires", "Cellulose Esters in Highly Filled Elastomeric Systems", and "Process for Dispersing Cellulose Esters into Elastomeric Compositions"; the disclosures of which are hereby incorporated by reference to the extent that they do not contradict the statements herein.

DETAILED DESCRIPTION

In one embodiment of the invention, a cellulose ester composition is provided comprising at least one cellulose ester, at least one compatibilizer, and optionally, at least one plasticizer.

The cellulose ester/elastomer composition of the present invention can comprise at least about 1, 2, 3, 4, 5, or 10 parts per hundred rubber ("phr") of at least one cellulose ester, based on the total weight of the elastomers. Additionally or alternatively, the cellulose ester/elastomer composition of the present invention can comprise not more than about 75, 50, 40, 30, or 20 phr of at least one cellulose ester, based on the total weight of the elastomers. The term "phr," as used herein, refers to parts of a respective material per 100 parts by weight of rubber or elastomer.

The cellulose ester utilized in this invention can be any that is known in the art. The cellulose esters useful in the present invention can be prepared using techniques known in the art or can be commercially obtained, e.g., from Eastman Chemical Company, Kingsport, Tenn., U.S.A.

The cellulose esters of the present invention generally comprise repeating units of the structure:

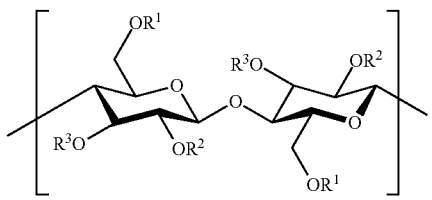

wherein $R^1$, $R^2$, and $R^3$ may be selected independently from the group consisting of hydrogen or a straight chain alkanoyl having from 2 to 10 carbon atoms. For cellulose esters, the substitution level is usually expressed in terms of degree of substitution ("DS"), which is the average number of substitutents per anhydroglucose unit ("AGU"). Generally, conventional cellulose contains three hydroxyl groups per AGU that can be substituted; therefore, the DS can have a value between zero and three. Alternatively, lower molecular weight cellulose mixed esters can have a total degree of substitution ranging from about 3.08 to about 3.5. Generally, cellulose is a large polysaccharide with a degree of polymerization from 700 to 2,000 and a maximum DS of 3.0. However, as the degree of polymerization is lowered, as in low molecular weight cellulose mixed esters, the end groups of the polysaccharide backbone become relatively more significant, thereby resulting in a DS ranging from about 3.08 to about 3.5.

Because DS is a statistical mean value, a value of 1 does not assure that every AGU has a single substituent. In some cases, there can be unsubstituted AGUs, some with two substitutents, and some with three substitutents. The "total DS" is defined as the average number of substitutents per AGU. In one embodiment of the invention, the cellulose esters can have a total DS per AGU (DS/AGU) of at least about 0.5, 0.8, 1.2, 1.5, or 1.7. Additionally or alternatively, the cellulose esters can have a total DS/AGU of not more than about 3.0, 2.9, 2.8, or 2.7. The DS/AGU can also refer to a particular substituent, such as, for example, hydroxyl, acetyl, butyryl, or propionyl. For instance, a cellulose acetate can have a total DS/AGU for acetyl of about 2.0 to about 2.5, while a cellulose acetate propionate ("CAP") and cellulose acetate butyrate ("CAB") can have a total DS/AGU of about 1.7 to about 2.8.

The cellulose ester can be a cellulose triester or a secondary cellulose ester. Examples of cellulose triesters include, but are not limited to, cellulose triacetate, cellulose tripropionate, or cellulose tributyrate. Examples of secondary cellulose esters include cellulose acetate, cellulose acetate propionate, and cellulose acetate butyrate. These cellulose esters are described in U.S. Pat. Nos. 1,698,049; 1,683,347; 1,880,808; 1,880,560; 1,984,147, 2,129,052; and 3,617,201, which are incorporated herein by reference in their entirety to the extent they do not contradict the statements herein.

In one embodiment of the invention, the cellulose ester is selected from the group consisting of cellulose acetate, cellulose acetate propionate, cellulose acetate butyrate, cellulose triacetate, cellulose tripropionate, cellulose tributyrate, and mixtures thereof.

The degree of polymerization ("DP") as used herein refers to the number of AGUs per molecule of cellulose ester. In one embodiment of the invention, the cellulose esters can have a DP of at least about 2, 10, 50, or 100. Additionally or alternatively, the cellulose esters can have a DP of not more than about 10,000, 8,000, 6,000, or 5,000.

In certain embodiments, the cellulose esters can have an inherent viscosity ("IV") of at least about 0.2, 0.4, 0.6, 0.8, or 1.0 deciliters/gram as measured at a temperature of 25° C. for a 0.25 gram sample in 100 ml of a 60/40 by weight solution of phenol/tetrachloroethane. Additionally or alternatively, the cellulose esters can have an IV of not more than about 3.0, 2.5, 2.0, or 1.5 deciliters/gram as measured at a temperature of 25° C. for a 0.25 gram sample in 100 ml of a 60/40 by weight solution of phenol/tetrachloroethane.

In certain embodiments, the cellulose esters can have a falling ball viscosity of at least about 0.005, 0.01, 0.05, 0.1, 0.5, 1, or 5 pascals-second ("Pa·s"). Additionally or alternatively, the cellulose esters can have a falling ball viscosity of not more than about 50, 45, 40, 35, 30, 25, 20, or 10 Pa·s.

In certain embodiments, the cellulose esters can have a hydroxyl content of at least about 1.2, 1.4, 1.6, 1.8, or 2.0 weight percent.

In certain embodiments, the cellulose esters useful in the present invention can have a weight average molecular weight ($M_w$) of at least about 5,000, 10,000, 15,000, or 20,000 as measured by gel permeation chromatography ("GPC"). Additionally or alternatively, the cellulose esters useful in the present invention can have a weight average molecular weight ($M_w$) of not more than about 400,000, 300,000, 250,000, 100,000, or 80,000 as measured by GPC. In another embodiment, the cellulose esters useful in the present invention can have a number average molecular weight ($M_w$) of at least about 2,000, 4,000, 6,000, or 8,000 as measured by GPC. Additionally or alternatively, the cellulose esters useful in the present invention can have a number average molecular weight ($M_n$) of not more than about 100,000, 80,000, 60,000, or 40,000 as measured by GPC.

In certain embodiments, the cellulose esters can have a glass transition temperature ("Tg") of at least about 50° C., 55° C., 60° C., 65° C., 70° C., 75° C., or 80° C. Additionally or alternatively, the cellulose esters can have a Tg of not more than about 200° C., 190° C., 180° C., 170° C., 160° C., 150° C., 140° C., or 130° C.

In one embodiment of the present invention, the cellulose esters utilized in the cellulose ester/elastomer compositions have not previously been subjected to fibrillation or any other fiber-producing process. In such an embodiment, the cellulose esters are not in the form of fibrils and can be referred to as "non-fibril."

The cellulose esters can be produced by any method known in the art. Examples of processes for producing cellulose esters are taught in Kirk-Othmer, Encyclopedia of Chemical Technology, 5th Edition, Vol. 5, Wiley-Interscience, New York (2004), pp. 394-444. Cellulose, the starting material for producing cellulose esters, can be obtained in different grades and from sources such as, for example, cotton linters, softwood pulp, hardwood pulp, corn fiber and other agricultural sources, and bacterial celluloses.

One method of producing cellulose esters is by esterification. In such a method, the cellulose is mixed with the appropriate organic acids, acid anhydrides, and catalysts and then converted to a cellulose triester. Ester hydrolysis is then performed by adding a water-acid mixture to the cellulose triester, which can be filtered to remove any gel particles or fibers. Water is added to the mixture to precipitate out the cellulose ester. The cellulose ester can be washed with water to remove reaction by-products followed by dewatering and drying.

The cellulose triesters that are hydrolyzed can have three substitutents selected independently from alkanoyls having from 2 to 10 carbon atoms. Examples of cellulose triesters include cellulose triacetate, cellulose tripropionate, and cellulose tributyrate or mixed triesters of cellulose such as cellulose acetate propionate and cellulose acetate butyrate. These cellulose triesters can be prepared by a number of methods known to those skilled in the art. For example, cellulose triesters can be prepared by heterogeneous acylation of cellulose in a mixture of carboxylic acid and anhydride in the presence of a catalyst such as $H_2SO_4$. Cellulose triesters can also be prepared by the homogeneous acylation of cellulose dissolved in an appropriate solvent such as LiCl/DMAc or LiCl/NMP.

Those skilled in the art will understand that the commercial term of cellulose triesters also encompasses cellulose esters that are not completely substituted with acyl groups. For example, cellulose triacetate commercially available from Eastman Chemical Company, Inc., Kingsport, Tenn., U.S.A., typically has a DS from about 2.85 to about 2.95.

After esterification of the cellulose to the triester, part of the acyl substitutents can be removed by hydrolysis or by alcoholysis to give a secondary cellulose ester. Secondary cellulose esters can also be prepared directly with no hydrolysis by using a limiting amount of acylating reagent. This process is particularly useful when the reaction is conducted in a solvent that will dissolve cellulose.

In another embodiment of the invention, low molecular weight mixed cellulose esters can be utilized, such as those disclosed in U.S. Pat. No. 7,585,905, which is incorporated herein by reference to the extent it does not contradict the statements herein.

In one embodiment of the invention, a low molecular weight mixed cellulose ester is utilized that has the following properties: (A) a total DS/AGU of from about 3.08 to about 3.50 with the following substitutions: a DS/AGU of hydroxyl of not more than about 0.70, a DS/AGU of C3/C4 esters from about 0.80 to about 1.40, and a DS/AGU of acetyl of from about 1.20 to about 2.34; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In another embodiment of the invention, a low molecular weight mixed cellulose ester is utilized that has the following properties: a total DS/AGU of from about 3.08 to about 3.50 with the following substitutions: a DS/AGU of hydroxyl of not more than about 0.70; a DS/AGU of C3/C4 esters from about 1.40 to about 2.45, and DS/AGU of acetyl of from about 0.20 to about 0.80; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In yet another embodiment of the invention, a low molecular weight mixed cellulose ester is utilized that has the following properties: a total DS/AGU of from about 3.08 to about 3.50 with the following substitutions: a DS/AGU of hydroxyl of not more than about 0.70; a DS/AGU of C3/C4 esters from about 2.11 to about 2.91, and a DS/AGU of acetyl of from about 0.10 to about 0.50; an IV of from about 0.05 to about 0.15 dL/g, as measured in a 60/40 (wt./wt.) solution of phenol/tetrachloroethane at 25° C.; a number average molecular weight of from about 1,000 to about 5,600; a weight average molecular weight of from about 1,500 to about 10,000; and a polydispersity of from about 1.2 to about 3.5.

In certain embodiments, the cellulose esters utilized in this invention can also contain chemical functionality. In such embodiments, the cellulose esters are described herein as "derivatized," "modified," or "functionalized" cellulose esters.

Functionalized cellulose esters are produced by reacting the free hydroxyl groups of cellulose esters with a bifunctional reactant that has one linking group for grafting to the cellulose ester and one functional group to provide a new chemical group to the cellulose ester. Examples of such bifunctional reactants include succinic anhydride, which links through an ester bond and provides acid functionality; mercaptosilanes, which links through alkoxysilane bonds and provides mercapto functionality; and isocyanotoethyl methacrylate, which links through a urethane bond and gives methacrylate functionality.

In one embodiment of the invention, the functionalized cellulose esters comprise at least one functional group selected from the group consisting of unsaturation (double bonds), carboxylic acids, acetoacetate, acetoacetate imide, mercapto, melamine, and long alkyl chains.

Bifunctional reactants to produce cellulose esters containing unsaturation (double bonds) functionality are described in U.S. Pat. Nos. 4,839,230, 5,741,901, 5,871,573, 5,981,738, 4,147,603, 4,758,645, and 4,861,629; all of which are incorporated by reference to the extent they do not contradict the statements herein. In one embodiment, the cellulose esters containing unsaturation are produced by reacting a cellulose ester containing residual hydroxyl groups with an acrylic-based compound and m-isopropyenyl-$\alpha,\alpha'$-dimethylbenzyl isocyanate. The grafted cellulose ester is a urethane-containing product having pendant (meth)acrylate and $\alpha$-methylstyrene moieties. In another embodiment, the cellulose esters containing unsaturation are produced by reacting maleic anhydride and a cellulose ester in the presence of an alkaline earth metal or ammonium salt of a lower alkyl monocarboxylic acid catalyst, and at least one saturated monocarboxylic acid have 2 to 4 carbon atoms. In another embodiment, the cellulose esters containing unsaturation are produced from the reaction product of (a) at least one cellulosic polymer having isocyanate reactive hydroxyl functionality and (b) at least one hydroxyl reactive poly($\alpha,\beta$ ethyleneically unsaturated) isocyanate.

Bifunctional reactants to produce cellulose esters containing carboxylic acid functionality are described in U.S. Pat. Nos. 5,384,163, 5,723,151, and 4,758,645; all of which are incorporated by reference to the extent they do not contradict the statements herein. In one embodiment, the cellulose esters containing carboxylic acid functionality are produced by reacting a cellulose ester and a mono- or di-ester of maleic or furmaric acid, thereby obtaining a cellulose derivative having double bond functionality. In another embodiment, the cellulose esters containing carboxylic acid functionality has a first and second residue, wherein the first residue is a residue of a cyclic dicarboxylic acid anhydride and the second residue is a residue of an oleophilic monocarboxylic acid and/or a residue of a hydrophilic monocarboxylic acid. In yet another embodiment, the cellulose esters containing carboxylic acid functionality are cellulose acetate phthalates, which can be prepared by reacting cellulose acetate with phthalic anhydride.

Bifunctional reactants to produce cellulose esters containing acetoacetate functionality are described in U.S. Pat. No. 5,292,877, which is incorporated by reference to the extent it does not contradict the statements herein. In one embodiment, the cellulose esters containing acetoacetate functionality are produced by contacting: (i) cellulose; (ii) diketene, an alkyl acetoacetate, 2,2,6, trimethyl-4H 1,3-dioxin-4-one, or a mixture thereof, and (iii) a solubilizing amount of solvent system comprising lithium chloride plus a carboxamide selected from the group consisting of 1-methyl-2-pyrrolidinone, N,N dimethylacetamide, or a mixture thereof.

Bifunctional reactants to produce cellulose esters containing acetoacetate imide functionality are described in U.S. Pat. No. 6,369,214, which is incorporated by reference to the extent it does not contradict the statements herein. Cellulose esters containing acetoacetate imide functionality are the reaction product of a cellulose ester and at least one acetoacetyl group and an amine functional compound comprising at least one primary amine.

Bifunctional reactants to produce cellulose esters containing mercapto functionality are described in U.S. Pat. No. 5,082,914, which is incorporated by reference to the extent it does not contradict the statements herein. In one embodiment of the invention, the cellulose ester is grafted with a silicon-containing thiol component which is either commercially available or can be prepared by procedures known in the art. Examples of silicon-containing thiol compounds include, but are not limited to, (3-mercaptopropyl)trimethoxysilane, (3-mercaptopropyl)-dimethyl-methoxysilane, (3-mercaptopropyl)dimethoxymethylsilane, (3-mercaptopropyl)dimethylchlorosilane, (3-mercaptopropyl)dimethylethoxysilane, (3-mercaptopropyl)diethyoxy-methylsilane, and (3-mercapto-propyl)triethoxysilane.

Bifunctional reactants to produce cellulose esters containing melamine functionality are described in U.S. Pat. No. 5,182,379, which is incorporated by reference to the extent it does not contradict the statements herein. In one embodiment, the cellulose esters containing melamine functionality are prepared by reacting a cellulose ester with a melamine compound to form a grafted cellulose ester having melamine moieties grafted to the backbone of the anhydrogluclose rings of the cellulose ester. In one embodiment, the melamine compound is selected from the group consisting of methylol ethers of melamine and aminoplast carrier elastomers.

Bifunctional reactants to produce cellulose esters containing long alkyl chain functionality are described in U.S. Pat. No. 5,750,677, which is incorporated by reference to the extent it does not contradict the statements herein. In one embodiment, the cellulose esters containing long alkyl chain functionality are produced by reacting cellulose in carboxamide diluents or urea-based diluents with an acylating reagent using a titanium-containing species. Cellulose esters containing long alkyl chain functionality can be selected from the group consisting of cellulose acetate hexanoate, cellulose acetate nonanoate, cellulose acetate laurate, cellulose palmitate, cellulose acetate stearate, cellulose nonanoate, cellulose hexanoate, cellulose hexanoate propionate, and cellulose nonanoate propionate.

The plasticizer utilized in this invention can be any that is known in the art that can reduce the melt temperature and/or the melt viscosity of the cellulose ester. The plasticizer can be either monomeric or polymeric in structure. In one embodiment, the plasticizer is at least one selected from the group consisting of a phosphate plasticizer, benzoate plasticizer, adipate plasticizer, a phthalate plasticizer, a glycolic acid ester, a citric acid ester plasticizer and a hydroxyl-functional plasticizer.

In one embodiment of the invention, the plasticizer can be selected from at least one of the following: triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

In another embodiment of the invention, the plasticizer can be one or more esters comprising: (i) at least one acid residue including residues of phthalic acid, adipic acid, trimellitic acid, succinic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms.

In another embodiment of the invention, the plasticizer can be selected from at least one of the following: esters comprising: (i) at least one acid residue selected from the group consisting of phthalic acid, adipic acid, trimellitic acid, succinic acid, benzoic acid, azelaic acid, terephthalic acid, isophthalic acid, butyric acid, glutaric acid, citric acid and phosphoric acid; and (ii) at least one alcohol residue selected from the group consisting of aliphatic, cycloaliphatic, and aromatic alcohol containing up to about 20 carbon atoms.

In another embodiment of the invention, the plasticizer can comprise alcohol residues where the alcohol residues is at least one selected from the following: stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

In another embodiment of the invention, the plasticizer can be selected from at least one of the following: benzoates, phthalates, phosphates, arylene-bis(diaryl phosphate), and isophthalates. In another embodiment, the plasticizer comprises diethylene glycol dibenzoate, abbreviated herein as "DEGDB".

In another embodiment of the invention, the plasticizer can be selected from at least one of the following: aliphatic polyesters comprising $C_{2-10}$ diacid residues, for example, malonic acid, succinic acid, glutaric acid, adipic acid, pimelic acid, suberic acid, azelaic acid, and sebacic acid; and $C_{2-10}$ diol residues.

In another embodiment, the plasticizer can comprise diol residues which can be residues of at least one of the following $C_2-C_{10}$ diols: ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

In another embodiment of the invention, the plasticizer can include polyglycols, such as, for example, polyethylene glycol, polypropylene glycol, and polybutylene glycol. These can range from low molecular weight dimers and trimers to high molecular weight oligomers and polymers. In one embodiment, the molecular weight of the polyglycol can range from about 200 to about 2000.

In another embodiment of the invention, the plasticizer comprises at least one of the following: Resoflex® R296 plasticizer, Resoflex® 804 plastocizer, SHP (sorbitol hexapropionate), XPP (xylitol pentapropionate), XPA (xylitol pentaacetate), GPP (glucose pentaacetate), GPA (glucose pentapropionate) and APP (arabitol pentapropionate).

In another embodiment of the invention, the plasticizer comprises one or more of: A) from about 5 to about 95 weight % of a $C_2-C_{12}$ carbohydrate organic ester, wherein the carbohydrate comprises from about 1 to about 3 monosaccharide units; and B) from about 5 to about 95 weight % of a $C_2-C_{12}$ polyol ester, wherein the polyol is derived from a $C_5$ or $C_6$ carbohydrate. In one embodiment, the polyol ester does not comprise or contain a polyol acetate or polyol acetates.

In another embodiment, the plasticizer comprises at least one carbohydrate ester and the carbohydrate portion of the carbohydrate ester is derived from one or more compounds selected from the group consisting of glucose, galactose, mannose, xylose, arabinose, lactose, fructose, sorbose, sucrose, cellobiose, cellotriose and raffinose.

In another embodiment of the invention, the plasticizer comprises at least one carbohydrate ester and the carbohydrate portion of the carbohydrate ester comprises one or more of α-glucose pentaacetate, β-glucose pentaacetate, α-glucose pentapropionate, β-glucose pentapropionate, α-glucose pentabutyrate and β-glucose pentabutyrate.

In another embodiment, the plasticizer comprises at least one carbohydrate ester and the carbohydrate portion of the carbohydrate ester comprises an α-anomer, a β-anomer or a mixture thereof.

In another embodiment of the invention, the plasticizer can be a solid, non-crystalline resin. These resins can contain some amount of aromatic or polar functionality and can lower the melt viscosity of the cellulose esters. In one embodiment of the invention, the plasticizer can be a solid, non-crystalline compound (resin), such as, for example, rosin; hydrogenated rosin; stabilized rosin, and their monofunctional alcohol esters or polyol esters; a modified rosin including, but not limited to, maleic- and phenol-modified rosins and their esters; terpene resins; phenol-modified terpene resins; coumarin-indene resins; phenolic resins; alkylphenol-acetylene resins; and phenol-formaldehyde resins.

In another embodiment of the invention, the plasticizer can be a tackifier resin. Any tackifier known to a person of ordinary skill in the art may be used in the cellulose ester/elastomer compositions. Tackifiers suitable for the compositions disclosed herein can be solids, semi-solids, or liquids at room temperature. Non-limiting examples of tackifiers include (1) natural and modified rosins (e.g., gum rosin, wood rosin, tall oil rosin, distilled rosin, hydrogenated rosin, dimerized rosin, and polymerized rosin); (2) glycerol and pentaerythritol esters of natural and modified rosins (e.g., the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin); (3) copolymers and terpolymers of natured terpenes (e.g., styrene/terpene and alpha methyl styrene/terpene); (4) polyterpene resins and hydrogenated polyterpene resins; (5) phenolic modified terpene resins and hydrogenated derivatives thereof (e.g., the resin product resulting from the condensation, in an acidic medium, of a bicyclic terpene and a phenol); (6) aliphatic or cycloaliphatic hydrocarbon resins and the hydrogenated derivatives thereof (e.g., resins resulting from the polymerization of monomers consisting primarily of olefins and diolefins); (7) aromatic hydrocarbon resins and the hydrogenated derivatives thereof; and (8) aromatic modified aliphatic or cycloaliphatic hydrocarbon resins and the hydrogenated derivatives thereof; and combinations thereof.

In another embodiment of the invention, the tackifier resins include rosin-based tackifiers (e.g. AQUATAC® 9027, AQUATAC® 4188, SYLVALITE®, SYLVATAC® and SYL V AGUM® rosin esters from Arizona Chemical, Jacksonville, Fla.). In other embodiments, the tackifiers include polyterpenes or terpene resins (e.g., SYLVARES® 15 terpene resins from Arizona Chemical, Jacksonville, Fla.). In other embodiments, the tackifiers include aliphatic hydrocarbon resins such as resins resulting from the polymerization of monomers consisting of olefins and diolefins (e.g., ESCOREZ® 1310LC, ESCOREZ® 2596 from ExxonMobil Chemical Company, Houston, Tex. or PICCOTAC® 1095 from Eastman Chemical Company, Kingsport, Tenn.) and the hydrogenated derivatives 20 thereof; alicyclic petroleum hydrocarbon resins and the hydrogenated derivatives thereof (e.g. ESCOREZ® 5300 and 5400 series from ExxonMobil Chemical Company; EASTOTAC® resins from Eastman Chemical Company). In some embodiments, the tackifiers include hydrogenated cyclic hydrocarbon resins (e.g. REGALREZ® and REGALITE® resins from Eastman Chemical Company). In further embodiments, the tackifiers are modified with tackifier modifiers including aromatic compounds (e.g., ESCOREZ® 2596 from ExxonMobil Chemical Company or PICCOTAC® 7590 from Eastman Chemical Company) and low softening point resins (e.g., AQUATAC 5527 from Arizona Chemical, Jacksonville, Fla.). In some embodiments, the tackifier is an aliphatic hydrocarbon resin having at least five carbon atoms.

The amount of plasticizer in the cellulose ester composition can range from about 1 to about 50 weight percent based on the weight of the cellulose ester. Another range can be from about 5 to about 35 weight percent based on the weight of the cellulose ester.

The compatibilizer can be either a non-reactive compatibilizer or a reactive compatibilizer. The compatibilizer can enhance the ability of the cellulose ester to reach a desired small particle size to improve the dispersion of the cellulose ester into an elastomer. The compatibilizers used can also improve mechanical and physical properties of the cellulose ester/elastomer compositions by improving the interfacial interaction/bonding between the cellulose ester and the elastomer.

When non-reactive compatibilizers are utilized, the compatibilizer contains a first segment that is compatible with the cellulose ester and a second segment that is compatible with a nonpolar elastomer. The first segment contains polar functional groups, which provide compatibility with the cellulose ester, including, but not limited to, such polar functional groups as ethers, esters, amides, alcohols, amines, ketones and acetals. The first segment may consist of oligomers or polymers of the following: cellulose esters; cellulose ethers; polyoxyalkylene, such as, polyoxyethylene, polyoxypropylene, polyoxybutylene; polyglycols, such as, polyethylene glycol, polypropylene glycol, polybutylene glycol; polyesters, such as, polycaprolactone, polylactic acid, aliphatic polyesters, aliphatic-aromatic copolyesters; polyacrylates and polymethacrylates; polyacetals; polyvinylpyrrolidone; polyvinyl acetate; and polyvinyl alcohol. In one embodiment, the first segment is polyoxyethylene or polyvinyl alcohol.

The second segment is compatible with the nonpolar elastomer and contains nonpolar groups. The second segment can be either saturated or unsaturated hydrocarbon groups or contain both saturated and unsaturated hydrocarbon groups. The second segment can be an oligomer or a polymer. In one embodiment of the invention, the second segment of the non-reactive compatibilizer is selected from the group consisting of polyolefins, polydienes, polyaromatics, and copolymers. An example of a polyaromatic second segment is polystyrene. An example of a copolymer second segment is styrene/butadiene copolymer.

In one embodiment, the first and second segments of the non-reactive compatibilizers can be in a diblock, triblock, branched or comb structure. The molecular weight of the non-reactive compatibilizers can range from about 300 to about 20,000 or from about 500 to about 10,000 or from about 1,000 to about 5,000. The segment ratio of the non-reactive compatibilizers can range from about 15 to about 85% polar first segments to about 15 to about 85% nonpolar second segments.

Examples of non-reactive compatibilizers include, but are not limited to, ethoxylated alcohols, ethoxylated alkylphenols, ethoxylated fatty acids, block polymers of propylene oxide and ethylene oxide, polyglycerol esters, polysaccharide esters, and sorbitan esters. Examples of ethoxylated alcohols are $C_{11}$-$C_{15}$ secondary alcohol ethoxylates, polyoxyethylene cetyl ether, polyoxyethylene stearyl ether, and $C_{12}$-$C_{14}$ natural liner alcohol ethoxylated with ethylene oxide. $C_{11}$-$C_{15}$ secondary ethyoxylates can be obtained as Dow Tergitol® 15S from the Dow Chemical Company. Polyoxyethlene cetyl ether and polyoxyethylene stearyl ether can be obtained from ICI Surfactants under the Brij® series of products. $C_{12}$-$C_{14}$ natural linear alcohol ethoxylated with ethylene oxide can be obtained from Hoechst Celanese under the Genapol® series of products. Examples of ethoxylated alkylphenols include octylphenoxy poly(ethyleneoxy)ethanol and nonylphenoxy poly(ethyleneoxy)ethanol. Octylphenoxy poly(ethyleneoxy)ethanol can be obtained as Igepal® CA series of products from Rhodia, and nonylphenoxy poly(ethyleneoxy)ethanol can be obtained as Igepal CO series of products from Rhodia or as Tergitol® NP from Dow Chemical Company. Ethyoxylated fatty acids include polyethyleneglycol monostearate or monolaruate which can be obtained from Henkel under the Nopalcol® series of products. Block polymers of propylene oxide and ethylene oxide can be obtained under the Pluronic® series of products from BASF. Polyglycerol esters can be obtained from Stepan under the Drewpol® series of products. Polysaccharide esters can be obtained from Henkel under the Glucopon® series of products, which are alkyl polyglucosides. Sorbitan esters can be obtained from ICI under the Tween® series of products.

In another embodiment of the invention, the non-reactive compatibilizers can be synthesized in situ in the cellulose ester composition or the cellulose ester/elastomer composition by reacting cellulose ester-compatible compounds with elastomer-compatible compounds. These compounds can be, for example, telechelic oligomers, which are defined as prepolymers capable of entering into further polymerization or other reaction through their reactive end groups. In one embodiment of the invention, these in situ compatibilizers can have higher molecular weight from about 10,000 to about 1,000,000.

In another embodiment of the invention, the compatibilizer can be reactive. The reactive compatibilizer comprises a polymer or oligomer compatible with one component of the composition and functionality capable of reacting with another component of the composition. There are two types of reactive compatibilizers. The first reactive compatibilizer has a hydrocarbon chain that is compatible with a nonpolar elastomer and also has functionality capable of reacting with the cellulose ester. Such functional groups include, but are not limited to, carboxylic acids, anhydrides, acid chlorides, epoxides, and isocyanates. Specific examples of this type of reactive compatibilizer include, but are not limited to: long chain fatty acids, such as, stearic acid (octadecanoic acid); long chain fatty acid chlorides, such as, stearoyl chloride (octadecanoyl chloride); long chain fatty acid anhydrides, such as, stearic anhydride (octadecanoic anhydride); epoxidized oils and fatty esters; styrene maleic anhydride copolymers; maleic anhydride grafted polypropylene; copolymers of maleic anhydride with olefins and/or acrylic esters, e.g. terpolymers of ethylene, acrylic ester and maleic anhydride; and copolymers of glycidyl methacrylate with olefins and/or acrylic esters, e.g. terpolymers of ethylene, acrylic ester, and glycidyl methacrylate.

Reactive compatibilizers can be obtained as SMA® 3000 styrene maleic anhydride copolymer from Sartomer/Cray Valley, Eastman G-3015® maleic anhydride grafted polypropylene from Eastman Chemical Company, Epolene® E-43 maleic anhydride grafted polypropylene obtained from Westlake Chemical, Lotader® MAH 8200 random terpolymer of ethylene, acrylic ester, and maleic anhydride obtained from Arkema, Lotader® GMA AX 8900 random terpolymer of ethylene, acrylic ester, and glycidyl methacrylate, and Lotarder® GMA AX 8840 random terpolymer of ethylene, acrylic ester, and glycidyl methacrylate.

The second type of reactive compatibilizer has a polar chain that is compatible with the cellulose ester and also has functionality capable of reacting with a nonpolar elastomer. Examples of these types of reactive compatibilizers include cellulose esters or polyethylene glycols with olefin or thiol functionality. Reactive polyethylene glycol compatibilizers with olefin functionality include, but are not limited to, polyethylene glycol allyl ether and polyethylene glycol acrylate. An example of a reactive polyethylene glycol compatibilizer with thiol functionality includes polyethylene glycol thiol. An example of a reactive cellulose ester compatibilizer includes mercaptoacetate cellulose ester.

The amount of compatibilizer in the cellulose ester composition can range from about 1 wt % to about 40 wt % or from about 5 wt % to about 20 wt % based on the weight of the cellulose ester.

In another embodiment of this invention, a cellulose ester/elastomer composition is provided comprising at least one elastomer, at least one cellulose ester, and at least one additive; wherein the additive is at least one selected from the group consisting of at least one plasticizer and at least one compatibilizer. The cellulose esters, plasticizers, and compatibilizers have been previously described in this disclosure.

The term "elastomer," as used herein, can be used interchangeably with the term "rubber." Due to the wide applicability of the process described herein, the cellulose esters can be employed with virtually any type of elastomer. For instance, the elastomers utilized in this invention can comprise a natural rubber, a modified natural rubber, a synthetic rubber, and mixtures thereof.

In certain embodiments of the present invention, at least one of the elastomers is a non-polar elastomer. For example, a non-polar elastomer can comprise at least about 90, 95, 98, 99, or 99.9 weight percent of non-polar monomers. In one embodiment, the non-polar elastomer is primarily based on a hydrocarbon. Examples of non-polar elastomers include, but are not limited to, natural rubber, polybutadiene rubber, polyisoprene rubber, butyl rubber, styrene-butadiene rubber, polyolefins, ethylene propylene monomer rubber (EPM), ethylene propylene diene monomer (EPDM) rubber, and polynorbornene rubber. Examples of polyolefins include, but are not limited to, polybutylene, polyisobutylene, and ethylene propylene rubber. In another embodiment, the elastomer comprises a natural rubber, a styrene-butadiene rubber, and/or a polybutadiene rubber. Non-polar elastomers are often used in tire components.

In certain embodiments, the elastomer contains little or no nitrile groups. As used herein, the elastomer is considered a "non-nitrile" elastomer when nitrile monomers make up less than 10 weight percent of the elastomer. In one embodiment, the elastomer contains no nitrile groups.

These inventive cellulose ester/elastomer compositions can be utilized in various articles, including oil field elastomeric articles, weather stripping, and injected molded parts. Any elastomer known in the art for use in these articles can be utilized. When the cellulose ester/elastomer compositions are used in oil field elastomeric articles, the elastomers can be nitrile rubber, fluorocarbon rubber, chlorinated sulfonated polyethylene, polychloroprene, and mixtures thereof. When the cellulose ester/elastomer compositions are used in weather stripping, the elastomer can be natural rubber, polybutadiene rubber, polyisoprene rubber, butyl rubber, styrene-butadiene rubber, polyolefins, ethylene propylene monomer rubber (EPM), ethylene propylene diene monomer (EPDM) rubber, polynorbornene rubber, and mixtures thereof. When the cellulose ester/elastomer compositions are used in injected molder parts, the elastomer can be natural rubber, polybutadiene rubber, polyisoprene rubber, butyl rubber, styrene-butadiene rubber, polyolefins, ethylene propylene monomer rubber (EPM), ethylene propylene diene monomer (EPDM) rubber, polynorbornene rubber, and methyl methacrylate butadiene styrene rubber (MBS), styrene butadiene styrene rubber (SBS), styrene ethylene butylene (SEBS) rubber, silicone rubber, urethane rubber, and mixtures thereof.

The amount of cellulose ester in the cellulose ester/elastomer composition ranges from about 1 to about 50 parts per hundred rubber (phr) based on the elastomer. Other ranges are from about 5 to about 30 phr and about 3 to about 30 phr based on the weight of the elastomer.

In another embodiment of the present invention, the cellulose ester/elastomer composition can comprise at least about 1, 2, 3, 4, 5, or 10 parts per hundred rubber ("phr") of at least one cellulose ester, based on the total weight of the elastomers. Additionally or alternatively, the cellulose ester/elastomer composition of the present invention can comprise not more than about 75, 50, 40, 30, or 20 phr of at least one cellulose ester, based on the total weight of the elastomers. The term "phr," as used herein, refers to parts of a respective material per 100 parts by weight of rubber or elastomer.

The amount of compatibilizer can range from about 1% to about 40% by weight based on the weight of the cellulose ester. Another range is from about 5 to about 20% by weight based on the weight of the cellulose ester.

In another embodiment of the invention, the compatibilizer can comprise at least about 1, 2, 3, or 5 weight percent based on the weight of the cellulose ester. Additionally or alternatively, the compatibilizer can comprise not more than about 40, 30, 25, or 20 weight percent based the weight of the cellulose ester.

The amount of plasticizer can range from about 1% to about 50% by weight based on the weight of the cellulose ester. Another range is from about 5% to about 35% by weight based on the weight of the cellulose ester.

In another embodiment of the invention, the amount of plasticizer can range from at least about 1, 2, 5, or 10 weight percent based on the weight of the cellulose ester. Additionally or alternatively, the plasticizer can range from not more than about 60, 50, 40, or 35 weight percent based on the cellulose ester.

In another embodiment of the invention, the cellulose ester/elastomer compositions further comprise at least one crosslinking/curing agent. Crosslinking/curing agents can be any that is known in the art. Examples of crosslinking/curing agents include, but are not limited to, organic peroxides and sulfur.

The cellulose ester/elastomer compositions of the present invention can be incorporated into various types of end products.

In certain embodiments, the cellulose ester/elastomer composition is formed into a tire and/or a tire component. The tire component can comprise, for example, tire tread, subtread, undertread, body plies, belts, overlay cap plies, belt wedges, shoulder inserts, tire apex, tire sidewalls, bead fillers, and any other tire component that contains an elastomer. In one embodiment, the cellulose ester/elastomer composition is formed into tire tread, tire sidewalls, and/or bead fillers.

In certain embodiments, the cellulose ester/elastomer composition is incorporated into non-tire applications. Non-tire applications include, for example, a blow-out preventer, fire hoses, weather stripping, belts, injection molded parts, footwear, pharmaceutical closures, plant lining, flooring, power cables, gaskets, seals, and architectural trims. In particular, the cellulose ester/elastomer compositions can be utilized in various oil field applications such as, for example, blowout preventers, pump pistons, well head seals, valve seals, drilling hoses, pump stators, drill pipe protectors, down-hole packers, inflatable packers, drill motors, O-Rings, cable jackets, pressure accumulators, swab cups, and bonded seals.

In one embodiment, the tire component comprises at least one elastomer, at least one filler, the cellulose ester/elastomer composition, and optionally starch. The elastomer and cellulose ester composition have been previously discussed in this disclosure.

In certain embodiments, the cellulose ester/elastomer composition of the present invention can comprise one or more fillers, particularly in the production of tire components.

The fillers can comprise any filler that can improve the thermophysical properties of the cellulose ester/elastomer composition (e.g., modulus, strength, and expansion coefficient). For example, the fillers can comprise silica, carbon black, clay, alumina, talc, mica, discontinuous fibers including cellulose fibers and glass fibers, aluminum silicate, aluminum trihydrate, barites, feldspar, nepheline, antimony oxide, calcium carbonate, kaolin, and combinations thereof. In one embodiment, the fillers comprise an inorganic and nonpolymeric material. In another embodiment, the fillers comprise silica and/or carbon black. In yet another embodiment, the fillers comprise silica.

In certain embodiments, the cellulose ester/elastomer composition can comprise at least about 5, 10, 15, 20, 25, 30, 35, 40, 45, or 50 phr of one or more fillers, based on the total weight of the elastomers. Additionally or alternatively, the cellulose ester/elastomer composition can comprise not more than about 60, 50, or 40 phr of one or more fillers, based on the total weight of the elastomers.

The cellulose ester/elastomer composition of the present invention can comprise one or more additives.

In certain embodiments, the cellulose ester/elastomer composition can comprise at least about 1, 2, 5, 10, or 15 phr of one or more additives, based on the total weight of the elastomers. Additionally or alternatively, the cellulose ester/elastomer composition can comprise not more than about 70, 50, 40, 30, or 20 phr of one or more additives, based on the total weight of the elastomers.

The additives can comprise, for example, processing aids, carrier elastomers, tackifiers, lubricants, oils, waxes, surfactants, stabilizers, UV absorbers/inhibitors, pigments, antioxidants, extenders, reactive coupling agents, and/or branchers. In one embodiment, the additives comprise one or more cellulose ethers, starches, and/or derivatives thereof. In such an embodiment, the cellulose ethers, starches and/or derivatives thereof can include, for example, amylose, acetoxypropyl cellulose, amylose triacetate, amylose tributyrate, amylose tricabanilate, amylose tripropionate, carboxymethyl amylose, ethyl cellulose, ethyl hydroxyethyl cellulose, hydroxyethyl cellulose, methyl cellulose, sodium carboxymethyl cellulose, and sodium cellulose xanthanate.

In one embodiment, the additives comprise a non-cellulose ester processing aid. The non-cellulose ester processing aid can comprise, for example, a processing oil, starch, starch derivatives, and/or water. In such an embodiment, the cellulose ester/elastomer composition can comprise less than about 10, 5, 3, or 1 phr of the non-cellulose ester processing aid, based on the total weight of the elastomers. Additionally or alternatively, the cellulose ester/elastomer composition can exhibit a weight ratio of cellulose ester to non-cellulose ester processing aid of at least about 0.5:1, 1:1, 2:1, 3:1, 4:1, 5:1, 8:1, or 10:1.

In another embodiment, the cellulose ester/elastomer composition can comprise a starch and/or its derivatives. In such an embodiment, the cellulose ester/elastomer composition can comprise less than 10, 5, 3, or 1 phr of starch and its derivatives, based on the total weight of the elastomers. Additionally or alternatively, the cellulose ester/elastomer composition can exhibit a weight ratio of cellulose ester to starch of at least about 3:1, 4:1, 5:1, 8:1, or 10:1.

In another embodiment of the invention, a process for producing a cellulose ester composition is provided. The process comprises contacting at least one cellulose ester, at least one compatibilizer, and optionally, at least one plasticizer. The cellulose ester, plasticizer, and compatibilizer were previously discussed in this disclosure. The cellulose ester, compatibilizer, and optional plasticizer can be mixed in any order of addition.

In another embodiment of this invention, a process for producing a cellulose ester/elastomer composition is provided comprising: a) mixing at least one elastomer, at least one cellulose ester, and at least one additive for a sufficient time and temperature to disperse the cellulose ester to produce the cellulose ester/elastomer composition; wherein the additive is at least one selected from the group consisting of a compatibilizer and a plasticizer. A sufficient temperature is defined as the flow temperature of the cellulose ester which is generally about 50° C. above the Tg of the cellulose ester. The temperature at mixing is limited at the upper range by the processing temperature of the elastomer and at the lower range by the highest use temperature of the cellulose ester/elastomer composition.

It is known in the art that the efficiency of mixing two or more viscoelastic materials can depend on the ratio of the viscosities of the viscoelastic materials. For a given mixing equipment and shear rate range, the viscosity ratio of the dispersed phase (cellulose ester and additive) and continuous phase (elastomer) should be within specified limits for obtaining adequate particle size. In one embodiment of the invention where low shear rotational shearing equipment is utilized, such as, Banbury and Brabender mixers, the viscosity ratio of the dispersed phase (cellulose ester and additive) to the continuous phase (elastomer) can range from about 0.001 to about 5, from about 0.01 to about 5, and from about 0.1 to about 3. In yet another embodiment of the invention where high shear rotational/extensional shearing equipment is utilized, such as, twin screw extruders, the viscosity ratio of the dispersed phase (cellulose ester and additive) to the continuous phase (elastomer) can range from about 0.001 to about 500 and from about 0.01 to about 100.

It is also known in the art that when mixing two or more viscoelastic materials, the difference between the interfacial energy of the two viscoelastic materials can affect the efficiency of mixing. Mixing can be more efficient when the difference in the interfacial energy between the materials are less. In one embodiment of the invention, the surface tension difference between the dispersed phase (cellulose ester and additive) and continuous phase (elastomer) is less than about 100 dynes/cm, less than 50 dynes/cm, or less than 20 dynes/cm.

In one embodiment, the cellulose ester is softened and/or melted to allow breakdown of the cellulose ester into sufficiently small particle size under the specified mixing conditions. In one embodiment, the particle size of the cellulose ester can be between 50 microns to 50 nanometers. In one embodiment of the invention, the elastomer, at least one cellulose ester, and at least one additive are contacted at a temperature in the range of about 70° C. to about 220° C. or from about 100° C. to about 180° C., or from about 130° C. to about 160° C.

Mixing of the elastomer, cellulose ester, and additive can be accomplished by any method known in the art that is adequate to disperse the additive. Examples of mixing equipment include, but are not limited to, Banbury mixers, Brabender mixers, and extruders (single or twin screw). The shear energy during the mixing is dependent on the combination of equipment, blade design, rotation speed (rpm), and mixing time. The shear energy should be sufficient for breaking down softened/melted cellulose ester to a small enough size to disperse the cellulose ester throughout the elastomer. For example, when a Banbury mixer is utilized, the shear energy and time of mixing ranges from about 5 to about 15 minutes at 100 rpms.

The elastomer, cellulose ester and additive can be combined in any order during the process. In one embodiment, the cellulose ester is premixed with the compatibilizer and/or the plasticizer. The cellulose ester containing the compatibilizer and/or the plasticizer is then mixed with the elastomer. In another embodiment of the invention, when reactive compatibilizers are utilized, the reactive compatibilizers can be mixed with either the cellulose ester or the elastomer first, then the other components are added.

In another embodiment of the invention, a process to produce a cellulose ester/elastomer compositions comprising: a) mixing at least one elastomer, at least one cellulose ester and at least one additive for a sufficient time and temperature to disperse the cellulose ester throughout said elastomer to produce a cellulose ester/elastomer masterbatch; wherein the additive is at least one selected from the group consisting of a compatibilizer and a plasticizer; and b) mixing the masterbatch and at least one elastomer to produce the cellulose ester/elastomer composition. The elastomer in the masterbatch can be the same or different than that utilized to produce the cellulose ester/elastomer composition. The processes of mixing have been previously discussed in this disclosure.

This invention can be further illustrated by the following examples of preferred embodiments thereof, although it will be understood that these examples are included merely for purposes of illustration and are not intended to limit the scope of the invention unless otherwise specifically indicated.

EXAMPLES

Example 1

Non-Reactive Compatibilizer in Cellulose Ester/Elastomer Compositions

Experiments were conducted to evaluate certain non-reactive compatibilizer in cellulose ester/elastomer compositions. In Table 1, the non-reactive compatibilizers evaluated are listed.

TABLE 1

| Compatibilizer Compound | MW[1] | #CH$_2$[2] | #EO[3] | % EO | MP[4] ° C. |
|---|---|---|---|---|---|
| Tergitol ® 15-S-9 | 570 | 15 | 9 | 63 | <RT |
| Tergitol ® 15-S-30 | 1400 | 15 | 30 | 85 | ~50 |
| Polyethylene block polyethylene glycol[5] | 920 | 32 | 12 | 50 | ~100 |
| Polyethylene block polyethylene glycol | 2250 | 32 | 40 | 80 | ~85 |
| Polyethylene block polyethylene glycol | 1400 | 50 | 16 | 50 | ~100 |

[1]Molecular Weight
[2]Number of carbon atoms
[3]Number of Ethylene Oxide groups
[4]Melting Point
[5]PE Block PEG Tergitol® 15-S-9 and Tergitol® 15-S-30 are secondary alcohol ethoxylates obtained from Dow Chemical in Midland, Mich. The polyethylene block polyethylene glycol compatibilizers were obtained from Sigma-Aldrich. Although not wishing to be bound by theory, it is believed that the ethylene oxide units of the above compounds plasticizes the cellulose acetate butyrate and the hydrocarbon chain improves compatibility with the elastomer. Each of the compatibilizers was blended with cellulose acetate butyrate (CAB 551-0.01 and CAB 553.0.4) obtained from Eastman Chemical Company, Kingsport, Tenn. at 80:20 ratio in a Brabender mixer at 150° C. for 10 minutes at 100 rpm) followed by cryogrinding to prepare the masterbatches of cellulose ester and compatibilizer (MB 1-10) as shown in Table 2.

TABLE 2

| Master Batch | CAB 551-0.01 | CAB 553-0.4 | Tergitol 15-S-9 | Tergitol 15-S-30 | PE Block PEG | PE Block PEG | PE Block PEG | Tg, °C. |
|---|---|---|---|---|---|---|---|---|
| MB1 | 80 | | 20 | | | | | 49.3 |
| MB2 | 80 | | | 20 | | | | 52.6 |
| MB3 | 80 | | | | 20 | | | 54.3 |
| MB4 | 80 | | | | | 20 | | 66.6 |
| MB5 | 80 | | | | | | 20 | 97.5 |
| MB6 | | 80 | 20 | | | | | 82.3 |
| MB7 | | 80 | | 20 | | | | 75.8 |
| MB8 | | 80 | | | 20 | | | 84.2 |
| MB9 | | 80 | | | | 20 | | 69.5 |
| MB10 | | 80 | | | | | 20 | 104.7 |

Reference Tg for CAB 551-0.01 is 107° C. and for CAB 553-0.4 is 139° C.

All the above master batches of cellulose ester and compatibilizer are compounded with a non-oil modified solution styrene-butadiene rubber obtained as Duradene 761 from Firestone Polymers, Akron, Ohio, using the procedure outlined subsequently in these Examples to prepare sample compositions shown in Table 3.

TABLE 3

| Comp No. | Duradene 761 | CAB 551-0.01 | CAB 553-0.4 | MB1 | MB2 | MB3 | MB4 | MB5 | MB6 | MB7 | MB8 | MB9 | MB10 |
|---|---|---|---|---|---|---|---|---|---|---|---|---|---|
| 1.1 | 100 | | | | | | | | | | | | |
| 1.2 | 100 | 10 | | | | | | | | | | | |
| 1.3 | 100 | | | 12.5 | | | | | | | | | |
| 1.4 | 100 | | | | 12.5 | | | | | | | | |
| 1.5 | 100 | | | | | 12.5 | | | | | | | |
| 1.6 | 100 | | | | | | 12.5 | | | | | | |
| 1.7 | 100 | | | | | | | 12.5 | | | | | |
| 1.8 | 100 | 10 | | | | | | | | | | | |
| 1.9 | 100 | | | | | | | | 12.5 | | | | |
| 1.10 | 100 | | | | | | | | | 12.5 | | | |
| 1.11 | 100 | | | | | | | | | | 12.5 | | |
| 1.12 | 100 | | | | | | | | | | | 12.5 | |
| 1.13 | 100 | | | | | | | | | | | | 12.5 |

The amounts specified in Table 3 are based on 100 grams of rubber and expressed as parts per hundred rubber (phr). For example, for Composition 1.3, 100 grams of rubber was utilized as well as 12.5 grams of Masterbatch 1, which is an 80:20 ratio of cellulose acetate butyrate (CAB 553-0.4) and Tergitol 15-S-9 secondary alcohol ethoxylate.

All cellulose ester, elastomer, and compatibilizers in Table 3 were processed in a Brabender mixer for 30 minutes at 150° C. and 100 rpm to produce the cellulose ester/elastomer composition. Then, 2.5 phr dicumyl peroxide (curing agent) was added to each sample at 50-60° C. in a Brabender mixer for about 1 minute and then mixed for another 2-3 minutes to produce a partially cured cellulose ester/elastomer composition. The samples from the Brabender mixer were cured by compression molding for 45 minutes at 150° C. and 20000 psi.

The modulus, yield stress, and yield strain of the compression molded, cured cellulose ester/elastomer composition samples were measured as per ASTM D412 and are shown in Table 4. In the ASTM D412 method, samples were prepared by cutting the specimens with Die C. The speed of testing was 20 inches/min, and the gauge length was 63.5 mm (2.5 inch). The samples were conditioned in the laboratory for 40 hours at 50%+/−5% humidity and 72° F. The width of the specimen was 1 inch and the length was 4.5 inches.

TABLE 4

| Composition Number | Modulus, MPa | Yield Stress, MPa | Yield Strain, % |
|---|---|---|---|
| 1.1 | 6.99 | 1.37 | 22.11 |
| 1.2 | 7.75 | 1.66 | 22.44 |
| 1.3 | 8.29 | 1.67 | 24.41 |
| 1.4 | 8.61 | 1.91 | 26.67 |
| 1.5 | 7.87 | 1.86 | 28.23 |
| 1.6 | 9.57 | 2.03 | 26.76 |
| 1.7 | 9.53 | 1.98 | 24.73 |
| 1.8 | 10.77 | 1.27 | 12.93 |
| 1.9 | 10.14 | 1.45 | 16.8 |
| 1.10 | 7.46 | 1.62 | 25.88 |
| 1.11 | 6.44 | 1.16 | 21.42 |
| 1.12 | 9.08 | 1.53 | 20.02 |
| 1.13 | 10.61 | 1.63 | 17.33 |

In Compositions 1.3-1.7, the addition of the compatibilizer to the elastomer and cellulose ester showed an improvement in modulus, yield stress, and yield strain over the Comparative Compositions 1.1 and 1.2 containing either rubber alone or rubber and cellulose ester alone. In Compositions 1.9-1.13, the Yield Strain and Yield Stress were improved over the Comparative Composition 1.8.

Example 2

Reactive Compatabilizers in Cellulose Ester/Elastomer Compositions

Reactive compatibilizers were evaluated to improve the mixing of CAB in styrene butadiene rubber (SBR). The reactive compatibilizers were selected such that they contained reactive groups that can react with the CAB and the rest of the molecule is compatible with the SBR. The molecular weight, and the type and concentration of the reactive moiety were varied.

TABLE 5

| Brand Name | Chemical Composition | Manufacturer | Reactive Moiety | Mw | Acid number, mg KOH/gm | Tm, °C | Comments |
|---|---|---|---|---|---|---|---|
| SMA 3000 | Styrene maleic anhydride copolymer | Sartomer/Cray Valley | Maleic anhydride | 9500 | 285 | 180 (Tm ~ Tg + 55) | Styrene: MA = 3:1 |
| Eastman G-3015 | Maleic anhydride grafted polypropylene | Eastman | Maleic anhydride | 47000 | 15 | 156 | |
| Epolene ® E-43 | Maleic anhydride grafted polypropylene | Westlake Chemicals | Maleic anhydride | 15800 | 45 | 158 | |
| Lotader ® MAH 8200 | Random terpolymer of Ethylene, Acrylic ester and Maleic anhydride | Arkema | Maleic anhydride | | 17 | 100 | Maleic anhydride ~2.8 wt % Ester ~6.5 wt % |
| Lotader ® GMA AX 8900 | Random terpolymer of Ethylene, Acrylic ester and glycidyl Methacrylate | Arkema | Glycidyl Methacrylate (epoxy) | | NA | 65 | Glycidyl Methacrylate ~8 wt %, Ester ~25 wt % |
| Lotader ® GMA AX 8840 | Random terpolymer of Ethylene, Acrylic ester and glycidyl Methacrylate | Arkema | Glycidyl Methacrylate (epoxy) | | NA | 106 | Glycidyl Methacrylate ~8 wt %, Ester ~0 wt % |

The maleic anhydride and glycidyl methacrylate in these reactive compatibilizers can react with the hydroxyl group contained in the cellulose ester. Masterbatches of Duradene 761 styrene butadiene rubber and a reactive compatibilizer were produced as shown in Table 6. Duradene 761 styrene butadiene rubber and the reactive compatibilizer were mixed in a Brabender mixer at 100 rpm and 160° C. for 30 minutes to produce the masterbatches (MB1-MB6).

TABLE 6

| Composition No. | Duradene 761, gm | Compatibilizer | Compatibilizer quantity, gm |
|---|---|---|---|
| MB1 | 100 | SMA 3000 | 3 |
| MB2 | 100 | Eastman G-3015 | 3 |
| MB3 | 100 | Epolene ® E-43 | 3 |
| MB4 | 100 | Lotader ® MAH 8200 | 3 |
| MB5 | 100 | Lotader ® GMA AX 8900 | 3 |
| MB6 | 100 | Lotader ® GMA AX 8840 | 3 |

The cellulose ester/elastomer compositions produced are shown in Table 7. Composition Number 2.1 contained only SBR. Composition Number 2.2 contained only SBR and CAB 551-0.01. For Composition Numbers 2.3-2.8, the masterbatches produced containing SBR and compatibilizer were mixed with cellulose ester in a Brabender mixer at 100 rpm for 30 minutes at 150° C.

A CAB/plasticizer masterbatch was prepared by blending 100 g CAB 553-0.4 and 10 g Eastman 168 plasticizer (bis(2-ethylhexyl)-1,4-benzenedicarboxylate) obtained from Eastman Chemical Company using a Brabender mixer at 100 rpm and 150° C. for 10 minutes. The CAB/plasticizer masterbatch was cryo-ground to a powder. Eastman 168 plasticizer was added to reduce the Tg/Tm of the CAB 553-0.4 so that it melted at a processing temperature of about 150° C. The Tg of the CAB/plasticizer masterbatch was obtained by preparing samples dissolved in acetone followed by vacuum drying at 70° C. and analyzing the samples by Differential Scanning calorimetry (DSC) (2nd cycle). Only CAB 553-0.4 was utilized in the masterbatches. CAB 551-0.01 was mixed with Eastman 168 plasticizer to determine the Tg. The glass transition temperatures (Tg) of the cellulose ester/plasticizer compositions produced are shown in Table 8.

TABLE 7

| Composition Number | Duradene 761 | CAB 551-0.01 | MB (CAB/Plasticizer) | MB1 | MB2 | MB3 | MB4 | MB5 | MB6 |
|---|---|---|---|---|---|---|---|---|---|
| 2.1 | 100 | | | | | | | | |
| 2.2 | 100 | 10 | | | | | | | |
| 2.3 | | 10 | | 103 | | | | | |
| 2.4 | | 10 | | | 103 | | | | |
| 2.5 | | 10 | | | | 103 | | | |
| 2.6 | | 10 | | | | | 103 | | |
| 2.7 | | 10 | | | | | | 103 | |
| 2.8 | | 10 | | | | | | | 103 |
| 2.9 | 100 | | 11 | | | | | | |
| 2.10 | | | 11 | 103 | | | | | |
| 2.11 | | | 11 | | 103 | | | | |
| 2.12 | | | 11 | | | 103 | | | |
| 2.13 | | | 11 | | | | 103 | | |
| 2.14 | | | 11 | | | | | 103 | |
| 2.15 | | | 11 | | | | | | 103 |

TABLE 8

| | Plasticizer wt % | Tg, °C. |
|---|---|---|
| CAB 551-0.01 (10 g) + Plasticizer 168 (0.5 g) | 5 | 90.5 |
| CAB 551-0.01 (10 g) + Plasticizer 168 (1.0 g) | 10 | 75.5 |
| CAB 553-0.4 (10 g) + Plasticizer 168 (0.5 g) | 5 | 123.7 |
| CAB 553-0.4 (10 g) + Plasticizer 168 (1.0 g) | 10 | 109.5 |

Once the masterbatches were prepared, the CAB 551-0.01 and the CAB/Plasticizer Masterbatch were dried overnight at 50° C. to remove moisture before blending. Composition Numbers 2.1-2.15 were prepared by weighing each component in Table 6 separately and processing the components in a Brabender mixed at 100 rpm for 30 minutes at 150° C. In order to cure the cellulose ester/elastomer composition, 1 g of dicumyl peroxide (i.e. 2.5 phr) was added to the Brabender mixer over a period of about 1 minute and then the composition was further mixed for another 2-3 minutes to produce a partially cured cellulose ester/elastomer composition. The curing of the cellulose ester/elastomer composition was then completed by compression molding for 45 minutes at 150° C. and 20000 psi.

The modulus, yield stress and yield strain of the compression molded cured samples were measured as per ASTM D412 and are shown in Table 9.

TABLE 9

| Composition Number | Modulus, MPa | Yield Stress, MPa | Yield Strain, % |
|---|---|---|---|
| 2.1 | 6.99 | 1.37 | 22.11 |
| 2.2 | 7.66 | 1.45 | 21.66 |
| 2.3 | 14.08 | 2.01 | 18.05 |
| 2.4 | 10.55 | 1.73 | 17.62 |
| 2.5 | 7.01 | 1.45 | 23.27 |
| 2.6 | 14.65 | 1.79 | 13.66 |
| 2.7 | 9.89 | 1.69 | 20.00 |
| 2.8 | 11.36 | 2.2 | 22.62 |
| 2.9 | 10.48 | 1.39 | 14.52 |
| 2.10 | 11.82 | 1.69 | 15.23 |
| 2.11 | 9.89 | 1.72 | 18.68 |
| 2.12 | 8.92 | 1.68 | 20.49 |
| 2.13 | 8.95 | 1.53 | 18.49 |
| 2.14 | 6.82 | 1.32 | 23.19 |
| 2.15 | 7.35 | 1.56 | 25.23 |

These data show that the addition of CAB 551-0.01 to a masterbatch of rubber and a reactive compatibilizer in Compositions 2.3-2.8 showed an increase in modulus over Comparative Composition 2.1 with rubber alone or Composition 2.2 with rubber and CAB 551-0.01. Yield Strain and to some extent Yield Stress was also improved in Compositions 2.10-2.15 in comparison to Composition 2.9 when the CAB/Plasticizer masterbatch was added to the SBR/Compatibilizer masterbatch.

Example 3

Use of Plasticizers

Masterbatches of cellulose esters with two different plasticizers at various loadings were prepared in an attempt to lower the Tg of the cellulose esters such that their flow temperature is lower than the typical rubber processing temperature of 150° C. Compounding in a Brabender mixer at 150° C. for 10 minutes at 100 rpm followed by cryogrinding yielded the masterbatches shown in Table 10.

TABLE 10

| Master Batch | CE[1] | Tg of CE, °C. | Quantity of CE, g | Type of Plasticizer | Quantity of plasticizer, g | Tg of master Batch, °C. |
|---|---|---|---|---|---|---|
| MB1 | CAB 551-0.2 | 101 | 100 | Eastman 168[2] | 10 | 84 |
| MB2 | CAB 553-0.4 | 136 | 100 | Eastman 168 | 25 | 85 |
| MB3 | CAB 381-0.1 | 123 | 100 | Eastman 168 | 20 | 87 |
| MB4 | CAB 381-2 | 133 | 100 | Eastman 168 | 25 | 95 |
| MB5 | CAB 553-0.4 | 136 | 100 | Poly (ethylene glycol)[3] | 25 | 65 |
| MB6 | CAB 381-2 | 133 | 100 | Poly (ethylene glycol) | 25 | 70 |
| MB7 | CAP 504-0.2 | 159 | 100 | Poly (ethylene glycol) | 30 | 93 |
| MB8 | CAP 482-0.5 | 142 | 100 | Poly (ethylene glycol) | 25 | 90 |
| MB9 | CA 398-3 | 180 | 100 | Poly (ethylene glycol) | 40 | 109 |

[1]CE—Cellulose Ester
[2]bis(2-ethylhexyl)-1,4-benzene dicarboxylate
[3]polyethylene glycol—molecular weight 300—from Aldrich All the above masterbatches were compounded with styrene butadiene rubber (SBR). The SBR and the masterbatch were mixed in a Brabender mixer for 30 minutes at 150° C. and 100 rpm. 2.5 phr dicumyl peroxide (curing agent) were added to each sample at 50-60° C. in the Brabender mixer in 1 minute and then mixed for another 2-3 minutes. The samples from the Brabender mixer were compression molded for 45 minutes at 150° C. and 20000 psi. The formulation of these samples are shown in Table 11. Each cellulose ester containing masterbatch sample has 10 phr (parts per hundred rubber) cellulose ester.

TABLE 11

| Composition No. | CE | CE Quantity, g | Duradene 761, g |
|---|---|---|---|
| 3.1 | None | | 100 |
| 3.2 | MB1 | 11 | 100 |
| 3.3 | MB2 | 12.5 | 100 |
| 3.4 | MB3 | 12 | 100 |
| 3.5 | MB4 | 12.5 | 100 |

TABLE 11-continued

| Composition No. | CE | CE Quantity, g | Duradene 761, g |
|---|---|---|---|
| 3.6 | MB5 | 12.5 | 100 |
| 3.7 | MB6 | 12.5 | 100 |
| 3.8 | MB7 | 13 | 100 |
| 3.9 | MB8 | 12.5 | 100 |
| 3.10 | MB9 | 14 | 100 |

The modulus, yield stress and yield strain of the compression molded, cured, elastomer/cellulose ester composition samples were measured as per ASTM D412 and are shown in Table 12.

TABLE 12

| Composition Number | Modulus, MPa | Yield Stress, MPa | Yield Strain, % |
|---|---|---|---|
| 3.1 | 6.99 | 1.37 | 22.11 |
| 3.2 | 7.47 | 1.26 | 19.25 |
| 3.3 | 7.32 | 1.29 | 20.45 |
| 3.4 | 12.12 | 1.83 | 17.29 |
| 3.5 | 13.45 | 1.84 | 14.8 |
| 3.6 | 11.47 | 1.89 | 17.99 |
| 3.7 | 13.36 | 2.07 | 17.93 |
| 3.8 | 8.43 | 1.37 | 18.57 |
| 3.9 | 11.36 | 1.54 | 14.83 |
| 3.10 | 10.67 | 1.44 | 15.92 |

These data show that for Composition Numbers 3.2-3.11, the modulus was improved over Comparative Composition 3.1.

Example 4

Use of Cellulose Esters and Plasticizers in Tire Formulations

This example is provided to show the advantages of the use of cellulose esters with plasticizers in tire formulations over cellulose esters alone. Table 13 shows the tire formulations. All amounts in Table 13 are based on parts per hundred rubber (phr). Table 14 shows the cellulose ester/plasticizer masterbatch formulations.

Table 15 shows the mixing conditions. The components were mixed in a Banbury mixer, which was a Farrel BR mixer with steam heating and water cooling which is instrumented with computer monitors for temperature, rpm, and power. After preparing the elastomer/cellulose ester/plasticizer composition, the composition was cured $T_{90}+5$ minutes at 320° F. (160° C.).

TABLE 13

Formulations of Cellulose Ester-Filled Tire Tread Compounds

| Ingredients | Sample Name | CAB-1 | CAB-2 | CAB-3 |
|---|---|---|---|---|
| | | Stage 1 | | |
| Buna VSL 5025-2[1] | S-SBR, 37.5 phr TDAE[2] | 103.12 | 103.12 | 103.12 |
| Buna CB24[3] | PBD rubber | 25 | 25 | 25 |
| Rhodia 1165 MP | Silica | 70 | 70 | 70 |
| Si69[4] | Coupling agent | 5.47 | 5.47 | 5.47 |
| Sundex ® 790[5] | Aromatic Oil | 5 | 5 | 5 |
| Stearic acid | Cure Activator | 1.5 | 1.5 | 1.5 |
| | | Stage 2 | | |
| Product of stage 1 | | 210.09 | 210.09 | 210.09 |
| Cellulose Ester MB[6] | MB - 1 | 10 | | |
| | MB - 2 | | 12.5 | |
| | MB - 3 | | | 12.5 |
| Zinc oxide | Cure activator | 1.9 | 1.9 | 1.9 |
| Okerin ® wax 7240[7] | microcrystalline wax | 1.5 | 1.5 | 1.5 |
| Santoflex ® 6PPD[8] | Anti-oxidant | 2 | 2 | 2 |
| KK49[9] | process aid | 2 | 2 | 2 |
| | | Stage 3 | | |
| Product of stage 2 | | 217.49 | 229.99 | 229.99 |
| Sulfur | Cross-linker | 1.5 | 1.5 | 1.5 |
| Santocure ® CBS[10] | Accelerator | 1.3 | 1.3 | 1.3 |
| Perkacit ® DPG-grs[11] | Accelerator | 1.5 | 1.5 | 1.5 |
| Total | | 221.79 | 234.29 | 234.29 |

[1]S-SBR—solution styrene butadiene rubber obtained from Lanxess.
[2]TDAE—treated distillate aromatic extract
[3]PBD—polybutadiene rubber obtained from Lanxess
[4]Si69 is a sulfur-containing organosilane obtained from Arkema
[5]Sundex ® 790 is an aromatic oil obtained from Sunoco
[6]MB—Masterbatch
[7]Okerin ® wax 7240 is a microcrystalline wax obtained from Sovereign Chemical
[8]Santoflex 6PPD is an anti-oxidant obtained from Flexsys.
[9]KK49 is a processing aid obtained from Strutkol.
[10]Santocure ® CBS is an accelerator obtained from Flexsys.
[11]Perkacit ® DPG-grs is an accelerator obtained from Flexsys.

TABLE 14

Compositions of Plasticized Cellulose Ester Masterbatches

| MB-Y | CE | Tg before Plasticizer, C. | Plasticizer (Pz) | Pz level (g/100 g CE) | PHR of MB in formulation | Tg after plasticizer, C. |
|---|---|---|---|---|---|---|
| MB-1 | CAB 381-2 | 133 | None | — | 10 | 133 |
| MB-2 | CAB 381-2 | 133 | EMN 168[1] | 25 | 12.5 | 95 |
| MB-3 | CAB 381-2 | 133 | PEG-300[2] | 25 | 12.5 | 70 |

TABLE 15

Processing of Cellulose-Ester Filled Tire Tread Compounds in a Banbury Mixer

| Stage 1 mix conditions | |
|---|---|
| Start temperature | 65° C. |
| Starting rotor speed, rpm | 65 |
| Fill factor | 67% |
| Mix sequence | at 0 minute add elastomers |
| | at 1 minute add ⅔ silica + Si69 |
| | at 2 minute add ⅓ silica + others |
| | at 3 minute sweep |
| | at 3.5 minute increase rotor speed to ramp temperature to 160° C. in 4.5 minutes |
| Dump Condition | hold 2 minutes at 160° C. |
| | (Total mix time = 6.5 minutes) |
| Stage 2 mix conditions | |
| Start temperature | 65° C. |
| Starting rotor speed, rpm | 65 |
| Fill factor | 64% |
| Mix sequence | at 0 minute add ½ of first pass batch |
| | at 15 second add other ingredients in a pocket and ½ of first pass batch |
| | at 1 minute sweep |
| | at 1.5 minute increase rotor speed to ramp temperature to 140-145° C. in 3.5 minutes |
| Dump Condition | Hold 4 minutes at 140-145° C. |
| | (total mix time = 7.5 minutes) |
| Stage 3 mix conditions | |
| Start temperature | 50° C. |
| Starting rotor speed, rpm | 60 |
| Fill factor | 61% |
| Addition order | at 0 minute add ½ 2nd pass batch, at 15 second add sulfur, accelerators and ½ 2nd pass batch, sweep at 1 minute. |
| Dump conditions | 110° C. or 2 minute 30 second |

TABLE 16

Performance of Cellulose Ester-Filled Tire Tread Compounds

| Properties | CAB-1 CAB 381-2 | CAB-2 CAB 381-2 + 25 phc E168 | CAB-3 CAB 381-2 + 25 phc PEG |
|---|---|---|---|
| Compounding | | | |
| Mooney viscosity, 4 minute at 100° C. | 63.5 | 58.5 | 55.1 |
| Cured Rubber | | | |
| Phillips Dispersion | 1 | 4 | 4 |
| Break stress, psi | 2191 | 2240 | 2349 |
| Break strain, % | 386 | 387 | 366 |
| Modulus(M100), psi | 663 | 679 | 735 |
| Modulus (M300), psi | 1693 | 1723 | 1918 |
| Shore A Hardness | 61 | 59 | 62 |
| Tan Delta 0° C. | 0.306 | 0.292 | 0.313 |
| Tan Delta 60° C. | 0.082 | 0.081 | 0.076 |
| Rebound 0° C., % | 9.8 | 10.8 | 9.6 |
| Rebound 60° C., % | 62.2 | 62.8 | 64.0 |
| Wear, volume loss in mm$^3$ | 136 | 124 | 127 |

Performance Measurement:

Descriptions of various analytical techniques used to measure performance are provided below:

Mooney Viscosity: The Mooney Viscosities were measured according to ASTM D 1646.

PHILLIPS Dispersion Rating: The samples were cut with a razor blade, and pictures were taken at 30× magnification with an Olympus SZ60 Zoom Stereo Microscope interfaced with a PaxCam ARC digital camera and a Hewlett Packard 4600 LaserJet color printer. The pictures of the samples were then compared to a Phillips standard dispersion-rating chart having standards ranging from 1 (bad) to 10 (excellent).

Mechanical Properties: Break stress, break strain, modulus at 100%, and 300% strains were measured as per ASTM D412 using Die C for specimen preparation. The speed of testing was 20 inches/min, and the gauge length was 63.5 mm (2.5 inch). The samples were conditioned in the lab for 40 hours at 50%+/−5% humidity and 72° F. The width of specimen was 1 inch, and length was 4.5 inch.

Hardness: Shore A hardness was measured according to ASTM D2240.

Dynamic Mechanical Analysis—Temperature Sweep: A TA instruments Dynamic Mechanical Analyzer was used to complete the temperature sweeps using a tensile geometry. Storage modulus (E'), Loss modulus (E"), and tan delta (=E"/E') were measured as a function of temperature from −80° C. to 120° C. using 10 Hz frequency, and 5% static and 0.2% dynamic strain.

Rebound Test: The rebound pendulum test was carried out as per ASTM D7121-05.

Wear: Din abrasion testing was performed per ASTM 222.

The data show that without the use of a plasticizer, the cellulose ester did not disperse as well through the elastomer as shown by the poor Phillips Dispersion data. Further, the Mooney viscosities of the compositions containing both cellulose ester and plasticizer were lower than when plasticizer was not utilized. This shows that in the presence of the plasticizer, CEs acted as a processing aid and lowered Mooney viscosity. Furthermore, the break stress and wear was also improved over compositions without plasticizer, presumably indicating that in presence of the plasticizers, CEs can disperse into finer particles and can improve the properties that are dependent on particle size and/or surface area.

Example 5

Use of Modified Cellulose Esters in Tire Tread Formulations

This example is provided to show the advantages of the use of cellulose esters with plasticizers in tire formulations over formulations without cellulose esters. Table 17 shows the cellulose ester and plasticizer masterbatch formulations that are utilized in the tire formulations. Table 18 shows the tire formulations, and Table 19 shows the mixing conditions.

TABLE 17

Cellulose Ester/Plasticizer Masterbatches

| CE Sample | Composition | Quantity in formulation (phr) |
|---|---|---|
| CAB553DOA[1] | CAB 553-0.4 w/20 phCE DOA | 15 |
| CAB381DOA | CAB 381-0.1 w/10 phCE DOA | 18 |
| CAP482DOA | CAP 482-0.5 w/25 phCE DOA | 16.5 |
| CAB381TEG[2] | CAB-381-0.1 w/10 phCE TEG-EH | 18.75 |
| CAB381PEG[3] | CAB-381-0.1 w/10 phCE PEG | 16.5 |
| CAB381ESO[4] | CAB-381-0.1 w/15 phCE ESO | 16.5 |
| CAP482Triacetin[5] | CAP 482-0.5 w/30 phCE Triacetin | 19.5 |
| CAP482PEG | CAP 482-0.5 w/20 phCE PEG | 18 |

TABLE 17-continued

Cellulose Ester/Plasticizer Masterbatches

| CE Sample | Composition | Quantity in formulation (phr) |
|---|---|---|
| CAB381Triton[6] | CAB 381-0.1 w/10 phCE Triton X100 | 16.5 |

[1]DOA—dioctyl adipate
[2]TEG-EH—triethylene glycol bis(2-theyl hexanoate)
[3]PEG—poly(ethylene glycol), Mol. Wt. - 300
[4]ESO—epoxidized soybean oil
[5]Triacetin—glyceryl triacetate
[6]Triton ® X100—ethyoxylated octylphenol obtained from Dow Chemical

TABLE 18

Tire Formulations

| Ingredients | Sample name | Si65 | Si80 | Si65Oil15 | CE Samples |
|---|---|---|---|---|---|
| | | Stage 1 | | | |
| Buna VSL 5025-2 | S-SBR[1], 37.5 phr TDAE[2] | 89.38 | 89.38 | 89.38 | 89.38 |
| Buna CB 24 | PBD[3] rubber | 35 | 35 | 35 | 35 |
| Ultrasil ® 7000 GR[4] | Silica | 65 | 80 | 65 | 65 |
| N234 | Carbon black | 15 | 15 | 15 | 15 |
| Si 266 | Coupling agent | 5.08 | 6.24 | 5.08 | 5.08 |
| Sundex ® 790[5] | Aromatic oil | | | 15 | |
| Stearic acid | Cure Activator | 1.5 | 1.5 | 1.5 | 1.5 |
| Product of Stage 1 | MB1 | 210.96 | 227.12 | 225.96 | 210.96 |
| | | Stage 2 | | | |
| Product of Stage 1 | MB1 | 210.96 | 227.12 | 225.96 | 210.96 |
| CE product (Table 1) | Cellulose Ester | | | | As in Table 1 |
| Si 69 | Coupling agent | | | | 1.17 |
| Zinc oxide | Cure activator | 1.9 | 1.9 | 1.9 | 1.9 |
| Okerin ® wax 7240[6] | microcrystalline wax | 1.5 | 1.5 | 1.5 | 1.5 |
| Santoflex ® 6PPD[7] | Anti-oxidant | 2 | 2 | 2 | 2 |
| Product of Stage 2 | MB2 | 216.36 | 232.52 | 231.36 | 217.53 + CE |
| | | Stage 3 | | | |
| Product of Stage 2 | MB2 | 216.36 | 232.52 | 231.36 | 217.53 + CE |
| Sulfur | Cross-linker | 1.28 | 1.28 | 1.28 | 1.28 |
| Santocure ® CBS[8] | Accelerator | 1.1 | 1.1 | 1.1 | 1.1 |
| Perkacit ® DPG-grs[9] | Accelerator | 1.28 | 1.28 | 1.28 | 1.28 |
| Total | | 220.02 | 236.18 | 235.02 | 221.19 + CE |

[1]S-SBR—solution styrene butadiene rubber obtained from Lanxess.
[2]TDAE—treated distillate aromatic extract
[3]PBD—polybutadiene rubber obtained from Lanxess
[4]Ultrasil 7000 GR silica obtained from Evonik Industries
[5]Sundex ® 790 is an aromatic oil obtained from Sunoco
[6]Okerin ® wax 7240 is a microcrystalline wax obtained from Sovereign Chemical
[7]Santoflex ® 6PPD is an anti-oxidant obtained from Flexsys.
[8]Santocure ® CBS is an accelerator obtained from Flexsys.
[9]Perkacit ® DPG-grs is an accelerator obtained from Flexsys.

Banbury Mixing: The mixer is a Farrel BR mixer with steam heating and water cooling which is instrumented with computer monitors for temperature, rpm, and power.

Curing: The compounds were cured 30 minutes at 320° F. (160° C.).

TABLE 19

Processing of Cellulose Ester-filled Tire Tread Compounds in a Banbury mixer

| Stage 1 mix conditions | |
|---|---|
| Start temperature | 65° C. |
| Starting rotor speed, rpm | 65 |
| Fill factor | 67% |
| Ram pressure | 50 |
| Mix sequence | at 0 min add elastomers |
| | at 1 min add ⅔ silica + Si266 |
| | at 2 min add ⅓ silica + others |
| | at 3 min sweep |
| | at 3.5 min adjust (increase) rotor speed to increase temperature to 160° C. |
| Dump conditions | hold 2 min at 160° C. (total mix time = 6.5 min) |

| Stage 2 mix conditions | |
|---|---|
| start temperature | 65° C. |
| starting rotor speed, rpm | 65 |
| fill factor | 64% |
| ram pressure | 50 |
| mix sequence | at 0 min add ½ of first pass batch |
| | At 15 s add other ingredients and ½ of first pass batch |

TABLE 19-continued

Processing of Cellulose Ester-filled Tire Tread Compounds in a Banbury mixer

| | |
|---|---|
| dump conditions | at 1 min sweep.<br>at 1.5 min adjust (increase) rotor speed, ramp temperature to 150° C.<br>hold 4 min at 150° C. (Total mix time = 7.5 min) |

Stage 3 mix conditions

| | |
|---|---|
| start temperature | 50° C. |
| starting rotor speed, rpm | 60 |
| fill factor | 61% |
| ram pressure | 50 |

TABLE 19-continued

Processing of Cellulose Ester-filled Tire Tread Compounds in a Banbury mixer

| | |
|---|---|
| addition order | at 0 min ½ 2nd pass batch, at 15 s add sulfur, accelerator package, & ½ 2nd pass batch, sweep at 1 min. |
| dump conditions | 110° C. or 2 min 30 s |

Performance of the tire formulations are shown in Table 20.

Test Descriptions for Example 5:

Cure Rheometer: Oscillating Disk Rheometer (ODR) was performed according to ASTM D 2084. ts2 is the time it takes for the torque of the rheometer to increase 2 units above the minimum value. tc90 is the time to reach 90% of the difference between minimum to maximum torque.

The Mooney Viscosities were measured according to ASTM D 1646.

Phillips Dispersion Rating: The samples were cut with a razor blade, and pictures were taken at 30× magnification with an Olympus SZ60 Zoom Stereo Microscope interfaced with a PaxCam ARC digital camera and a Hewlett Packard 4600 LaserJet color printer. The pictures of the samples were then compared to a Phillips standard dispersion-rating chart having standards ranging from 1 (bad) to 10 (excellent)

Dynamic Mechanical Analysis (Strain Sweeps): Metravib DMA150 Dynamic Mechanical Analyzer was used in shear deformation to perform a double strain sweep experiment (simple shear 10 mm×2 mm). The experimental conditions were 0.001 to 0.5 dynamic strain at 13 points in evenly spaced log steps at 30° C. and 10 Hz.

Hot Molded Groove Trouser Tear (at 100° C.): Molded groove trouser tear (Type CP modified trouser tear test piece with a constrained path for tear) was performed according to ASTM test method D624.

Break stress and break strain were measured as per ASTM D412 using Die C for specimen preparation. The speed of testing was 20 inches/min, and the gauge length was 63.5 mm (2.5 inch). The samples were conditioned in the lab for 40 hours at 50%+/−5% humidity and 72° F. The width of specimen was 1 inch and length was 4.5 inch.

Dynamic Mechanical Analysis (Temperature Sweeps): TA instrument Dynamic Mechanical Analyzer was used in tensile mode to perform the temperature sweep experiment. The experimental conditions were 0.5 static and 0.5 dynamic strain from −20° C. to 120° C. at 10 Hz.

TABLE 20

Performance of Cellulose Ester-filled Tire Tread Compounds

| Sample Name | Tc90 (min) | Ts2 (min) | Mooney After 4 min at 100° C. (Mooney Units) | Phillips Dispersion Rating | DMA (5% stain in shear) Storage Modulus at 30° C. (Pa) | DMA (5% stain in shear) Tan Delta at 30° C. | Molded Groove Tear at 100° C. lbf/in | Break stress psi | Break strain % | DMA (5% strain in tension) Tan Delta at 0° C. |
|---|---|---|---|---|---|---|---|---|---|---|
| Si65 | 10.9 | 2.26 | 82.3 | 7 | 1800000 | 0.265 | 119 | 2720.4 | 381.5 | 0.4019 |
| Si80 | 13.1 | 2 | 94.3 | 7 | 2330000 | 0.329 | 114 | 2475.1 | 298.5 | 0.4445 |
| Si65Oil15 | 11 | 2.57 | 60.7 | 4 | 1410000 | 0.256 | 132 | 2471.8 | 428.1 | 0.4273 |
| CAB553DOA | 9.68 | 2.34 | 72 | 6 | 2010000 | 0.279 | 168 | 2709.5 | 457.8 | 0.4121 |
| CAB381DOA | 10.3 | 2.56 | 69.8 | 4 | 1960000 | 0.263 | 140 | 2911.4 | 424.4 | 0.4027 |
| CAP482DOA | 10.3 | 2.53 | 75.3 | 7 | 1930000 | 0.26 | 212 | 2599.4 | 431.8 | 0.3854 |
| CAB381TEG | 10.3 | 2.48 | 72.1 | 5 | 1990000 | 0.267 | 144 | 2776.5 | 414.4 | 0.4177 |
| CAB381PEG | 11.3 | 2.71 | 71 | 6 | 1980000 | 0.27 | 156 | 2857.8 | 402.4 | 0.4097 |
| CAB381ESO | 11.5 | 2.75 | 71.9 | 7 | 2090000 | 0.285 | 157 | 2640.6 | 402.9 | 0.43 |
| CAP482Triacetin | 11.3 | 2.99 | 72 | 7 | 2000000 | 0.286 | 174 | 2660.8 | 415.4 | 0.4492 |
| CAP482PEG | 9.3 | 2.44 | 76.3 | 7 | 2280000 | 0.274 | 215 | 2991.4 | 522 | 0.4445 |
| CAB381Triton | 11.6 | 2.9 | 74 | 7 | 2250000 | 0.288 | 135 | 2704 | 386.5 | 0.4365 |

Data Discussion:

Table 20 shows the samples and corresponding performance measurements. There were three controls and nine modified cellulose esters included in Table 20. Si65, Si80 and Si65Oil15 were controls with 65 phr silica, 80 phr silica and 65 phr silica/15 phr additional oil, respectively, as detailed in Table 18. All of the modified cellulose ester formulations contain 65 phr silica and 15 phr modified cellulose ester.

Compared to control (Si65), addition of 15 phr CE provides the following improvements. The Tc90 data produced from the cure rheometer showed comparable or slightly faster cure times. Shorter cure times are desirable as this provides for faster turnaround times in curing molds and presses. The Ts2 data from the cure rheometer which indicates the scorch/handling time before onset of cure showed significantly longer handling/flowing/molding time over the Si65 control. The Mooney viscosity data of the inventive examples were significantly lower than the Si65 control showing that the addition of the cellulose ester and plasticizer provided for better processability of the cellulose ester/elastomer composition. The dispersion rating which indicates the quality of the filler dispersion was comparable to the Si65 control. The dynamic mechanical analysis strain modulus was improved over the Si65 control. The molded groove tear at 100° C. was significantly better than the Si65 control, and the dynamic mechanical analysis Tan Delta at 0° C. (wet traction) also showed significant improvement. The break stress and break strain data (compound cure/processing indicator) were all within target ranges.

In contrast, addition of 15 phr Si (Si80) had a detrimental effect on several properties, including Tc90, Ts2, Mooney viscosity, rolling resistance and break strain. Addition of 15 phr oil (Si65Oil15) had very significant detrimental effect on low strain modulus.

Example 6

Use of Modified Cellulose Esters in Various Tire Tread Formulations

A) Various Tire Tread Formulation were prepared as shown in Table. 21.

B) Processing

Banbury Mixing: The mixer was a Farrel BR mixer with steam heating and water cooling which was instrumented with computer monitors for temperature, rpm, and power. The processing of the cellulose ester-filled tire tread compounds in a Banbury mixer were the same as shown in Table 19 in Example 5.

Curing: The compounds were cured 30 minutes at 320° F. (160° C.).

C) Performance

Test Descriptions are the same as in Example 5.
Performance of the tire formulations are shown in Table 22

D) Data Discussion:

Control 1 vs. CE 1: CE on top of formulation. Improved viscosity (lower better, processability), low strain modulus (higher better, handling), tear (higher better), and tan delta at 0° C. (higher better, wet traction) and no significant negative impact on other properties measured.

Control 2 vs. CE 2: Cellulose ester replaced silica. Improved viscosity (lower better, processability), tan delta at 30° C. (lower better, rolling resistance) tear (higher better), but slightly worst low strain modulus (higher better, handling) and no significant negative impact on other properties measured.

Control 3 vs. CE 3: Cellulose ester replaced oil. Improved low strain modulus (higher better, handling), tear (higher better), but slightly worst viscosity (lower better, processability), and no significant negative impact on other properties measured.

TABLE 21

Tire Formulations

| Ingredients | Sample name | Control 1 | CE 1 | Control 2 | CE 2 | Control 3 | CE 3 |
|---|---|---|---|---|---|---|---|
| | | Stage 1 | | | | | |
| Buna VSL 4041 | S-SBR[1] | 65 | 65 | 65 | 65 | 65 | 65 |
| Buna CB 24 | PBD[2] rubber | 35 | 35 | 35 | 35 | 35 | 35 |
| Ultrasil ® 7000 GR[3] | Silica | 63 | 63 | 70 | 62 | 54 | 53 |
| N234 | Carbon black | 5 | 5 | 5 | 5 | 5 | 5 |
| Si 266 | Coupling agent | 4.91 | 4.91 | 5.46 | 4.84 | 4.21 | 4.13 |
| Tudalin 4192[4] | Aromatic oil | 33 | 33 | 26 | 25 | 28 | 22 |
| Stearic acid | Cure Activator | 1.5 | 1.5 | 1.5 | 1.5 | 1.5 | 1.5 |
| Product of Stage 1 | MB1 | 207.41 | 207.41 | 207.96 | 198.34 | 192.71 | 185.63 |
| | | Stage 2 | | | | | |
| Product of Stage 1 | MB1 | 207.41 | 207.41 | 207.96 | 198.34 | 192.71 | 185.63 |
| CAB381-0.5 w/22 phCE Triton ® X100 | Cellulose Ester | 0 | 8 | 0 | 9 | 0 | 7 |
| Si 266 | Coupling agent | 0 | 0.624 | 0 | 0.702 | 0 | 0.546 |
| Zinc oxide | Cure activator | 1.9 | 1.9 | 1.9 | 1.9 | 1.9 | 1.9 |
| Okerin ® wax 7240[5] | microcrystalline wax | 1.5 | 1.5 | 1.5 | 1.5 | 1.5 | 1.5 |
| Santoflex ® 6PPD[6] | Anti-oxidant | 2 | 2 | 2 | 2 | 2 | 2 |
| Product of Stage 2 | MB2 | 212.81 | 221.44 | 213.36 | 213.44 | 198.11 | 198.58 |
| | | Stage 3 | | | | | |
| Product of Stage 2 | MB2 | 212.81 | 221.44 | 213.36 | 213.44 | 198.11 | 198.58 |
| Sulfur | Cross-linker | 1.28 | 1.28 | 1.28 | 1.28 | 1.28 | 1.28 |
| Santocure ® CBS[7] | Accelerator | 1.1 | 1.1 | 1.1 | 1.1 | 1.1 | 1.1 |
| Perkacit ® DPG-grs[8] | Accelerator | 1.28 | 1.28 | 1.28 | 1.28 | 1.28 | 1.28 |
| Total | | 216.47 | 225.1 | 217.02 | 217.1 | 201.77 | 202.24 |

[1]S-SBR—solution styrene butadiene rubber obtained from Lanxess.
[2]PBD—polybutadiene rubber obtained from Lanxess
[3]Ultrasil 7000 GR silica obtained from Evonik Industries
[4]Tudelen 4192—treated distillate aromatic extract obtained by the H&R Group
[5]Okerin ® wax 7240 is a microcrystalline wax obtained from Sovereign Chemical
[6]Santoflex ® 6PPD is an anti-oxidant obtained from Flexsys.
[7]Santocure ® CBS is an accelerator obtained from Flexsys.
[8]Perkacit DPG-grs is an accelerator obtained from Flexsys.

TABLE 22

Performance of Cellulose Ester-filled Tire Tread Compounds

| Sample Name | Tc90 (min) | Ts2 (min) | Mooney After 4 min at 100° C. (Mooney Units) | DMA (5% strain in shear) Storage Modulus at 30° C. (Pa) | DMA (5% strain in shear) Tan Delta at 30° C. | Molded Groove Tear at 100° C. lbf/in | Break stress psi | Break strain % | DMA (5% strain in tension) Tan Delta at 0° C. |
|---|---|---|---|---|---|---|---|---|---|
| Control 1 | 13.4 | 3.99 | 40.2 | 1.14E+06 | 0.214 | 86.9 | 2342 | 686 | 0.323 |
| CE 1 | 11.6 | 4.37 | 36.4 | 1.20E+06 | 0.202 | 92.8 | 2352 | 644 | 0.368 |
| Control 2 | 13.4 | 3.05 | 54.2 | 1.59E+06 | 0.247 | 77.9 | 2376 | 565 | 0.386 |
| CE 2 | 10.5 | 3.52 | 45.0 | 1.47E+06 | 0.207 | 94.9 | 2563 | 626 | 0.378 |
| Control 3 | 10.4 | 3.43 | 39.6 | 1.11E+06 | 0.183 | 70.3 | 2463 | 628 | 0.344 |
| CE 3 | 8.4 | 3.33 | 42.5 | 1.33E+06 | 0.188 | 73.7 | 2669 | 653 | 0.333 |

That which is claimed is:

1. A tire comprising a cellulose ester/elastomer composition comprising:
(i) at least one cellulose ester, wherein at least one cellulose ester has;
(a) an inherent viscosity of about 0.2 to about 3.0 dL/g or
(b) a total degree of substitution per anhydroglucose unit from about 0.5 to about 2.8;
or wherein said at least one cellulose ester is a low molecular weight cellulose mixed ester selected from the group consisting of
a) a low molecular weight mixed cellulose ester having the following properties:
a total degree of substitution per anhydroglucose unit of from about 3.08 to about 3.50, having the following substitutions:
a degree of substitution per anhydroglucose unit of hydroxyl of no more than about 0.70;
a degree of substitution per anhydroglucose unit of $C_3$-$C_4$ esters from about 0.80 to about 1.40; and
a degree of substitution per anhydroglucose unit of acetyl of from about 1.20 to about 2.34;
an inherent viscosity of from about 0.05 to about 0.15 dL/g, as measured in a 60/40, wt./wt., solution of phenol/tetrachloroethane at 25° C.;
a number average molecular weight from about 1,000 to about 5,600;
a weight average molecular weight from about 1,500 to about 10,000; and
a polydispersity of from about 1.2 to about 3.5,
b) a low molecular weight mixed cellulose ester having the following properties:
a total degree of substitution per anhydroglucose unit of from about 3.08 to about 3.50, having the following substitutions:
a degree of substitution per anhydroglucose unit of hydroxyl of no more than about 0.70;
a degree of substitution per anhydroglucose unit of $C_{3-4}$ esters from about 1.40 to about 2.45; and
a degree of substitution per anhydroglucose unit of acetyl of from about 0.20 to about 0.80;
an inherent viscosity of from about 0.05 to about 0.15 dL/g, as measured in a 60/40, wt./wt., solution of phenol/tetrachloroethane at 25° C.;
a number average molecular weight from about 1,000 to about 5,600;
a weight average molecular weight from about 1,500 to about 10,000; and
a polydispersity from about 1.2 to about 3.5, and
c) a low molecular weight mixed cellulose ester having the following properties:
a total degree of substitution per anhydroglucose unit of from about 3.08 to about 3.50, having the following substitutions:
a degree of substitution per anhydroglucose unit of hydroxyl of no more than about 0.70;
a degree of substitution per anhydroglucose unit of $C_{3-4}$ esters from about 2.11 to about 2.91, and
a degree of substitution per anhydroglucose unit of acetyl of from about 0.10 to about 0.50;
an inherent viscosity of from about 0.05 to about 0.15 dL/g, as measured in a 60/40, wt./wt., solution of phenol/tetrachloroethane at 25° C.;
a number average molecular weight from about 1,000 to about 5,600;
a weight average molecular weight from about 1,500 to about 10,000; and
a polydispersity from about 1.2 to about 3.5;
(ii) at least one elastomer; and
(iii) at least one additive selected from the group consisting of at least one compatibilizer and at least one plasticizer, wherein said at least one cellulose ester is dispersed in said at least one elastomer, wherein said cellulose ester/elastomer composition comprises:
a continuous phase comprising said at least one elastomer; and
a dispersed phase comprising said at least one cellulose ester and said at least one additive.

2. The tire according to claim 1, wherein said at least one cellulose ester is a functionalized cellulose ester wherein said functionalized cellulose ester is functionalized by at least one bifunctional reactant producing a cellulose ester with at least one functional group selected from the group consisting of double bonds, carboxylic acids, acetoacetate, acetoacetate imide, mercapto, melamine, and alkyl chains.

3. The tire according to claim 1, wherein said at least one plasticizer is an ester comprising:
(i) acid residues comprising one or more residues of phthalic acid, adipic acid, trimellitic acid, succinic acid, benzoic acid, azelaic acid, terephthalic acid, isophthalic acid, butyric acid, glutaric acid, citric acid or phosphoric acid; or
(ii) alcohol residues comprising one or more residues of an aliphatic, cycloaliphatic, or aromatic alcohol containing up to about 20 carbon atoms.

4. The tire according to claim 1, wherein said at least one plasticizer comprises alcohol selected from the group consisting of stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol.

5. The tire according to claim 1, wherein said at least one plasticizer is selected from the group consisting of aliphatic polyesters comprising $C_{2-10}$ diacid residues and $C_{2-10}$ diol residues, wherein said $C_{2-10}$ diacid residues are at least one selected from the group consisting of malonic acid, succinic acid, glutaric acid, adipic acid, pimelic acid, suberic acid, azelaic acid, and sebacic acid.

6. The tire according to claim 1, wherein said at least one plasticizer comprises at least one diol residue selected from the group consisting of ethylene glycol, diethylene glycol, 1,2-propylene glycol, 1,3-propylene glycol, 1,2-butylene glycol, 1,3-butylene glycol, 1,4-butylene glycol, neopentyl glycol, 1,5-pentanediol, 1,6 hexanediol, 1,5-pentylene glycol, triethylene glycol, and tetraethylene glycol.

7. The tire according to claim 1, wherein said at least one plasticizer comprises one or more of:
A) from about 5 to about 95 weight % of a $C_{2-12}$ carbohydrate organic ester comprising from about 1 to about 3 monosaccharide units; or
B) from about 5 to about 95 weight % of a $C_{2-12}$ polyol ester, derived from a $C_5$ or $C_6$ carbohydrate.

8. The tire according to claim 1, wherein said at least one plasticizer comprises at least one carbohydrate ester and a carbohydrate portion of said at least one carbohydrate ester is selected from the group consisting of α-anomer, β-anomer, and a mixture thereof.

9. The tire according to claim 1, wherein said at least one plasticizer is selected from the group consisting of a phosphate plasticizer, a benzoate plasticizer, an adipate plasticizer, a phthalate plasticizer, a glycolic acid ester, a citric acid ester plasticizer and a hydroxyl-functional plasticizer.

10. The tire according to claim 9, wherein said at least one plasticizer is selected from the group consisting of triphenyl phosphate, tricresyl phosphate, cresyldiphenyl phosphate, octyldiphenyl phosphate, diphenylbiphenyl phosphate, trioctyl phosphate, tributyl phosphate, diethyl phthalate, dimethoxyethyl phthalate, dimethyl phthalate, dioctyl phthalate, dibutyl phthalate, di-2-ethylhexyl phthalate, butylbenzyl phthalate, dibenzyl phthalate, butyl phthalyl butyl glycolate, ethyl phthalyl ethyl glycolate, methyl phthalyl ethyl glycolate, triethyl citrate, tri-n-butyl citrate, acetyltriethyl citrate, acetyl-tri-n-butyl citrate, and acetyl-tri-n-(2-ethylhexyl) citrate.

11. The tire according to claim 1, wherein said at least one compatibilizer is a non-reactive compatibilizer, comprising:
a first segment that is compatible with said at least one cellulose ester; and
a second segment that is compatible with said at least one elastomer.

12. The tire according to claim 11, wherein said first segment of said non-reactive compatibilizer is at least one oligomer or polymer selected from the group consisting of cellulose esters, cellulose ethers, polyoxyalkylenes, polyglycols, polyesters, polyacrylates, polymethacrylates, polyacetals, polyvinylpyrrolidone, polyvinyl acetate, and polyvinyl alcohol.

13. The tire according to claim 11, wherein said second segment of said non-reactive compatibilizer is selected from the group consisting of polyolefins, polydienes, polyaromatics, and copolymers.

14. The tire according to claim 11, wherein said non-reactive compatibilizer is selected from the group consisting of ethoxylated alcohols, ethoxylated alkylphenols, ethoxylated fatty acids, block polymers of propylene oxide and ethylene oxide, polyglycerol esters, polysaccharide esters, and sorbitan esters.

15. The tire according to claim 1, wherein said at least one compatibilizer is a reactive compatibilizer comprising:
a hydrocarbon chain that is compatible with said at least one elastomer; and
at least one functional group capable of reacting with said at least one cellulose ester.

16. The tire according to claim 15, wherein said reactive compatibilizer is selected from the group consisting of fatty acids, fatty acid chlorides, fatty acid anhydrides, epoxidized oils, epoxidized fatty esters, styrene maleic anhydride copolymers, maleic anhydride grafted polypropylene, copolymers of maleic anhydride with acrylic esters, copolymers of maleic anhydride with acrylic esters, and olefins, copolymers of glycidyl methacrylate with olefins and acrylic esters, copolymers of glycidyl methacrylate and olefins, and copolymers of glycidyl methacrylate with acrylic esters.

17. The tire according to claim 15, wherein said reactive compatibilizer comprises:
a polar chain that is compatible with said at least one cellulose ester; and at least one functional group capable of reacting with said at least one elastomer.

\* \* \* \* \*